United States Patent
Bayles et al.

(10) Patent No.: US 10,581,034 B2
(45) Date of Patent: Mar. 3, 2020

(54) BATTERY ASSEMBLY

(71) Applicant: Science Applications International Corporation, McLean, VA (US)

(72) Inventors: Gary A. Bayles, Millersville, MD (US); Charles R. Longabaugh, Hazleton, IN (US)

(73) Assignee: Science Applications International Corporation, Reston, VA (US)

( * ) Notice: Subject to any disclaimer, the term of this patent is extended or adjusted under 35 U.S.C. 154(b) by 45 days.

(21) Appl. No.: 15/914,391

(22) Filed: Mar. 7, 2018

(65) Prior Publication Data

US 2018/0261804 A1 Sep. 13, 2018

Related U.S. Application Data

(60) Provisional application No. 62/469,350, filed on Mar. 9, 2017.

(51) Int. Cl.
*H01M 2/02* (2006.01)
*H01M 2/20* (2006.01)
*H01M 10/615* (2014.01)
*H01M 2/10* (2006.01)
*H01M 10/658* (2014.01)
(Continued)

(52) U.S. Cl.
CPC ........... *H01M 2/029* (2013.01); *H01M 2/022* (2013.01); *H01M 2/1077* (2013.01); *H01M 2/1094* (2013.01); *H01M 2/1241* (2013.01); *H01M 2/204* (2013.01); *H01M 2/206* (2013.01); *H01M 10/486* (2013.01); *H01M 10/615* (2015.04); *H01M 10/653* (2015.04); *H01M 10/658* (2015.04); *H01M 10/6554* (2015.04);
(Continued)

(58) Field of Classification Search
CPC .............. H01M 2/029; H01M 10/658; H01M 10/6571; H01M 2/1094; H01M 2/1241; H01M 2/206; H01M 2/1077; H01M 10/486; H01M 10/6554; H01M 10/653; H01M 2/022; H01M 10/615; H01M 2/204; H01M 2200/103; H01M 10/0525
See application file for complete search history.

(56) References Cited

U.S. PATENT DOCUMENTS 9,196,939 B2   11/2015   Christian et al.
9,515,357 B2   12/2016   Haskins et al.
(Continued)

FOREIGN PATENT DOCUMENTS

CN   202084607 U   12/2011
CN   204497304 U   7/2015
(Continued)

OTHER PUBLICATIONS

May 11, 2018—(WO) Invitation to Pay Additional Fees and Partial International Search Report—App PCT/US2018/021306.
(Continued)

*Primary Examiner* — Cynthia K Walls
(74) *Attorney, Agent, or Firm* — Banner & Witcoff, Ltd.

(57) ABSTRACT

A battery assembly may include bus strips located on one or more sides and displaced ends of battery cells. The battery assembly may comprise a heater. The battery assembly may comprise one or more refractory panels. A refractory panel may comprise weakened regions corresponding to battery cells.

28 Claims, 16 Drawing Sheets

(51) Int. Cl.
*H01M 10/6571* (2014.01)
*H01M 10/48* (2006.01)
*H01M 10/653* (2014.01)
*H01M 2/12* (2006.01)
*H01M 10/6554* (2014.01)
*H01M 10/0525* (2010.01)

(52) U.S. Cl.
CPC .... *H01M 10/6571* (2015.04); *H01M 10/0525* (2013.01); *H01M 2200/103* (2013.01)

(56) References Cited

U.S. PATENT DOCUMENTS

| | | |
|---|---|---|
| 2011/0117408 A1 | 5/2011 | Lennox |
| 2012/0021260 A1 | 1/2012 | Yasui et al. |
| 2014/0017531 A1* | 1/2014 | Uehara ............... H01M 2/1077 429/82 |
| 2017/0214033 A1 | 7/2017 | Takano et al. |
| 2018/0212222 A1* | 7/2018 | Barton ................ H01M 2/1077 |

FOREIGN PATENT DOCUMENTS

| | | |
|---|---|---|
| WO | 2012/070220 A1 | 5/2012 |
| WO | 2014/059348 A2 | 4/2014 |
| WO | 2014/095348 A2 | 4/2014 |

OTHER PUBLICATIONS

Jul. 4, 2018—(WO) International Search Report and Written Opinion—App PCT/US2018/021306.

\* cited by examiner

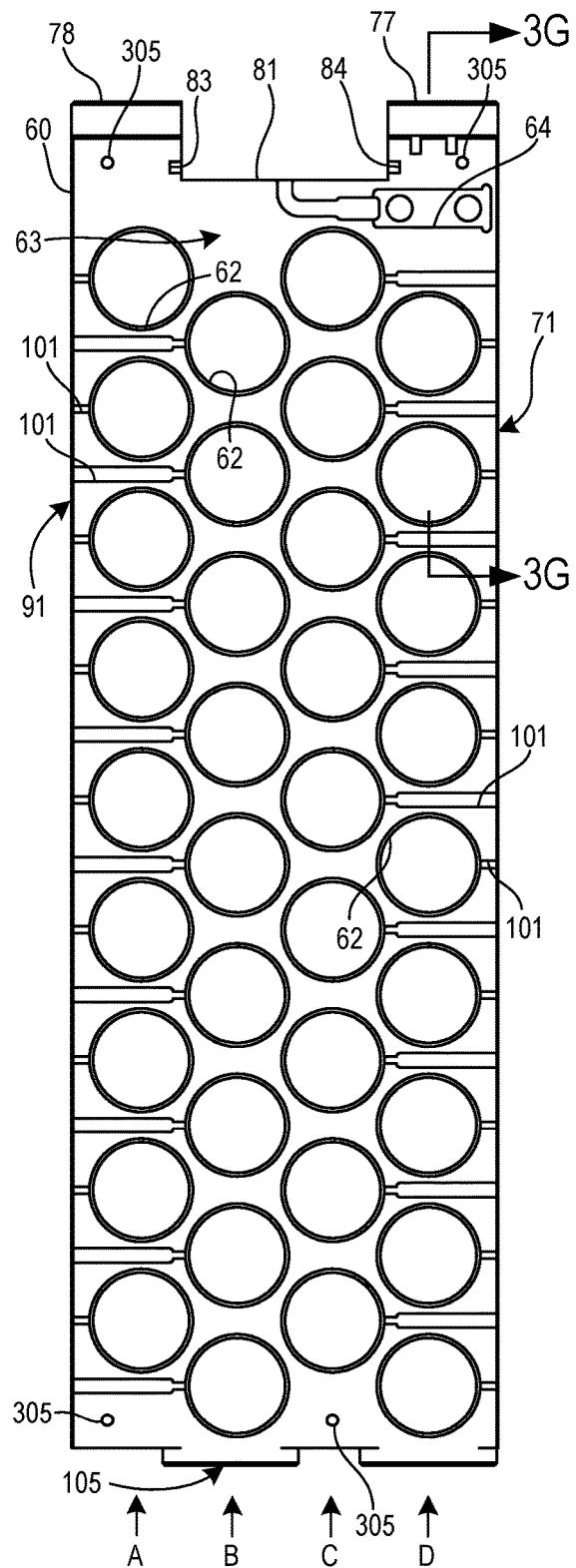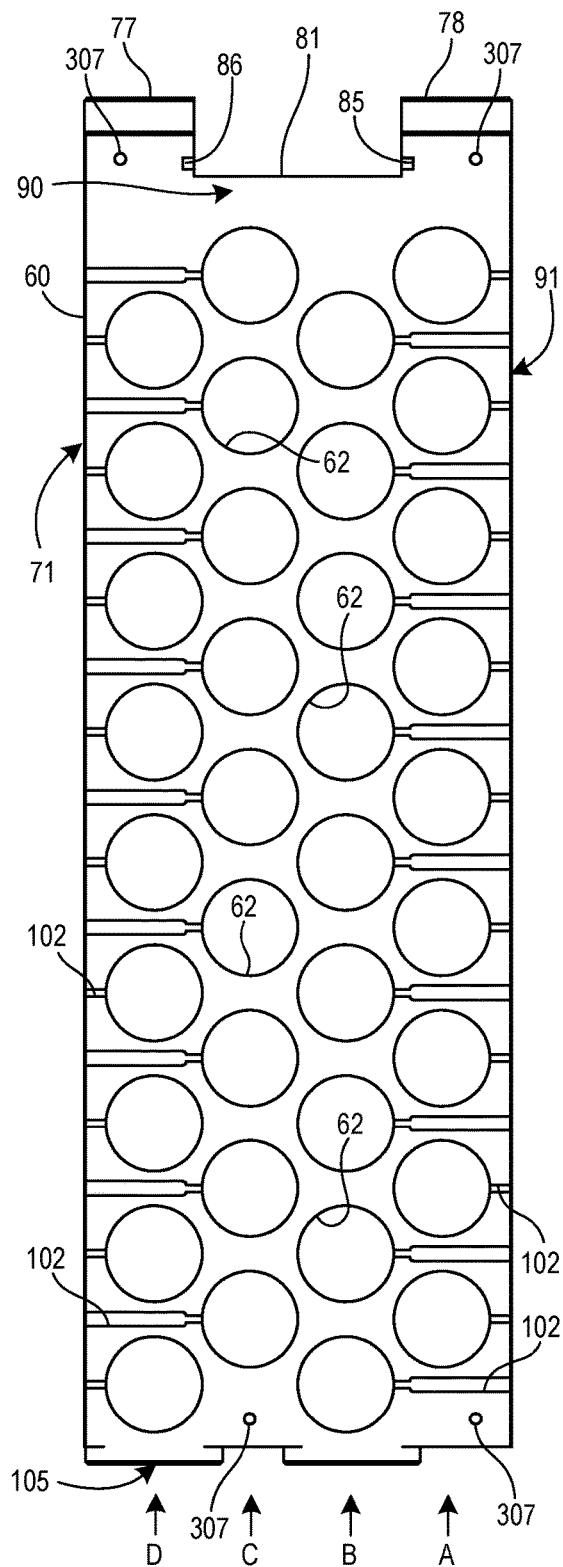
FIG. 3B
FIG. 3C

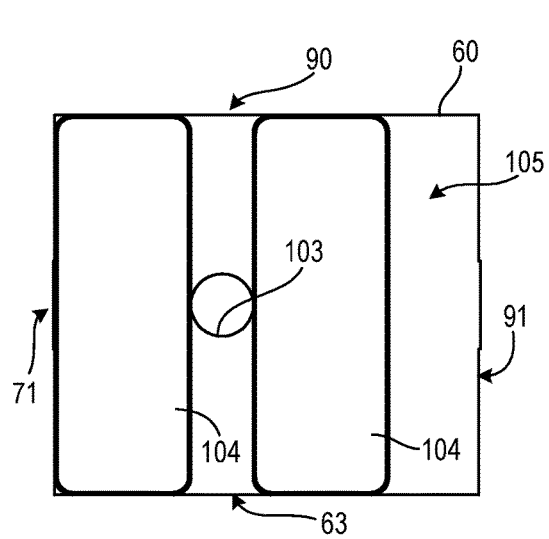
FIG. 3F
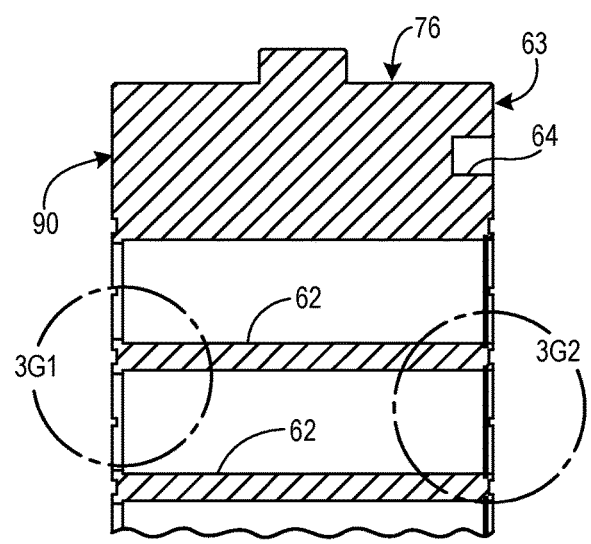
FIG. 3G
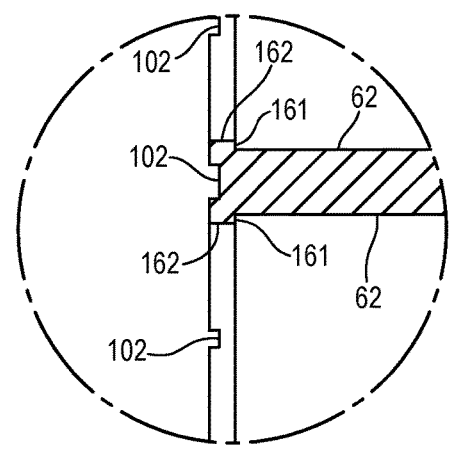
FIG. 3G1
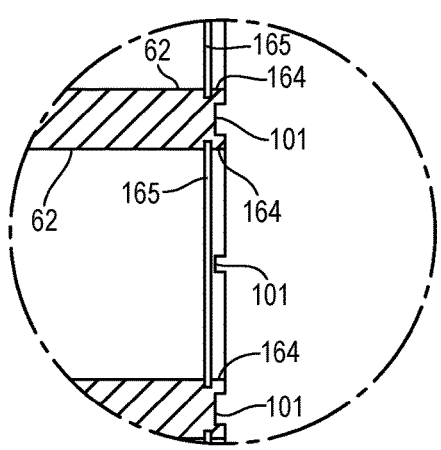
FIG. 3G2

BATTERY ASSEMBLY

CROSS REFERENCE TO RELATED APPLICATION

This application claims priority to U.S. provisional patent application No. 62/469,350, titled "Integrated Modular Assembly of Lithium-Ion Battery Cells With Built-In Heating and Tolerance to Individual Cell Thermal Runaway," and filed Mar. 9, 2017. Application No. 62/469,350, in its entirety, is incorporated by reference herein.

GOVERNMENT LICENSE RIGHTS

This invention was made with government support under Contract #N00178-04-D-4119/FC46 awarded by the United States Navy. The government has certain rights in the invention.

BACKGROUND

Commercial Off-The-Shelf (COTS) lithium-ion battery cells have been used in numerous types of devices. Under normal conditions, such cells may provide high energy and long cycle life. Under some conditions, however, additional measures may be needed for proper operation. For example, extreme low temperature conditions may require that a battery cell be pre-heated before recharging. Known methods for such heating may be bulky and/or inefficient. Moreover, some COTS lithium-ion cells may be susceptible to thermal runaway. When a lithium-ion cell fails in such a manner, substantial energy can be released. This energy release in one cell of a multi-cell battery array may potentially trigger a chain reaction of thermal runaways in other cells in that array.

SUMMARY

This Summary is provided to introduce a selection of some concepts in a simplified form as a prelude to the Detailed Description. This Summary is not intended to identify key or essential features.

A battery assembly may comprise a housing that includes a plurality of cell receptacles, each of which may hold a battery cell. Bus strips connected to the battery cells may be located on one or more sides of the housing so as to reduce exposure to material ejected from failing battery cells. The bus strips may be connected to the battery cells by connection branches recessed into the housing. The connection branches may comprise portions sized to form fuses. The battery assembly may comprise a heater and a heater spreader plate to facilitate operation in low temperatures and/or to dissipate heat from failing cells. One or more refractory panels may be placed over ends of the battery cells. A refractory panel may comprise weakened regions, located over ends of battery cells, that may break away to permit venting from a failing battery cell.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

FIGS. 3B, 3C, 3D, 3E, and 3F are respective rear, front, top, left side, and bottom views of the cell array housing of FIG. 3A.

FIG. 3G is a cross-sectional view taken from the plane indicated in FIG. 3B.

FIGS. 3G1 and 3G2 are enlargements of the indicated portions of FIG. 3G.

DETAILED DESCRIPTION

An example battery assembly may incorporate Commercial Off-The-Shelf (COTS) battery cells in a modular array. The battery cells may comprise lithium-ion cells and/or other types of battery cells. One or more of the features described herein may mitigate the effects of thermal runaway in one of the cells. In particular, one or more features may help prevent failure of one or more cells from propagating to other cells in the assembly. The assembly may also or alternatively include a built-in heater to facilitate operation in very low temperature environments (e.g., below 0° C.). Additional features are described below.

Figure 1A:
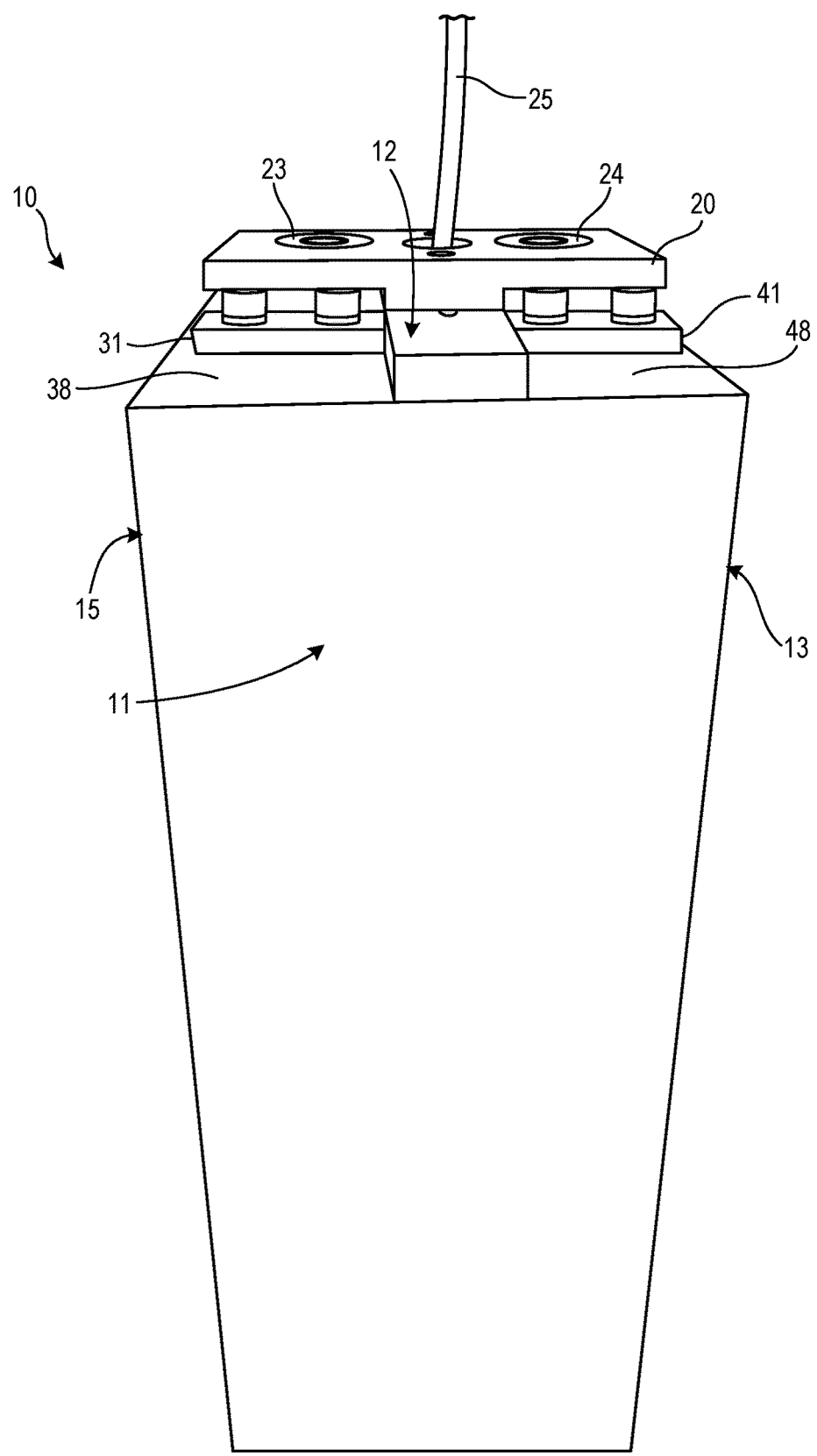
FIG. 1A is a right top perspective view of an example battery assembly.
Figure 1B:
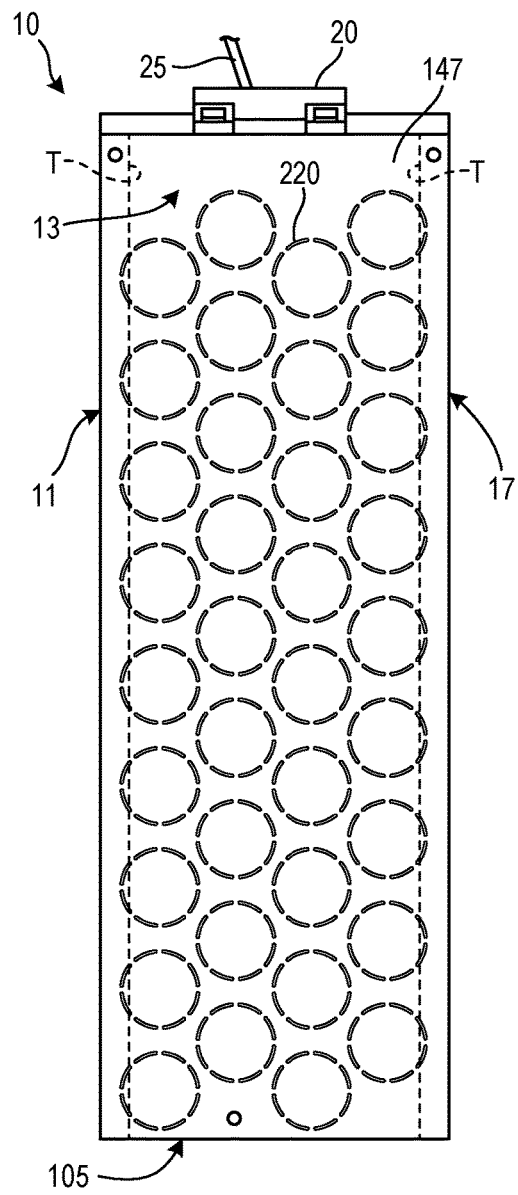
FIGS. 1B, 1C, and 1D are respective front, rear, and top views of the battery assembly of FIG. 1A.
Figure 1C:
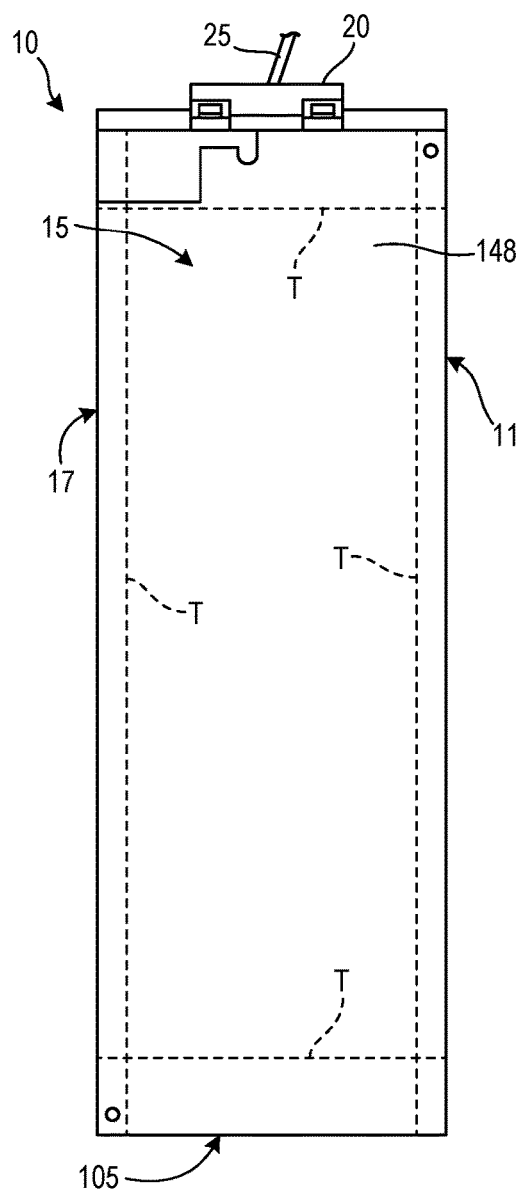

FIG. 1A is a right top perspective view of an example battery assembly 10. Visible in FIG. 1A are a right side 11 and a top 12 of the battery assembly 10. FIG. 1B is a front view showing a front 13 of the battery assembly 10. Visible in FIG. 1B as part of the front 13 is a front refractory panel 147. FIG. 1C is a rear view showing a rear 15 of the battery assembly 10. Visible in FIG. 1C as part of the rear 15 is a rear refractory panel 148. Non-conductive tape T, shown in broken lines, may be applied to portions of the battery assembly 10, as discussed below. Shrink-wrap, sheathing, and/or other overwrap material may also be used. In each of FIGS. 1A-1C, as well as in other drawing figures, one or more components visible in the figure may be discussed in connection with subsequent figures, but may be identified with a reference number in an earlier figure to facilitate understanding of the arrangement of components in the battery assembly 10. In one or more of the drawing figures, and to avoid obscuring the figures, less than all occurrences of a particular feature may be labeled with reference numbers.

Figure 1D:
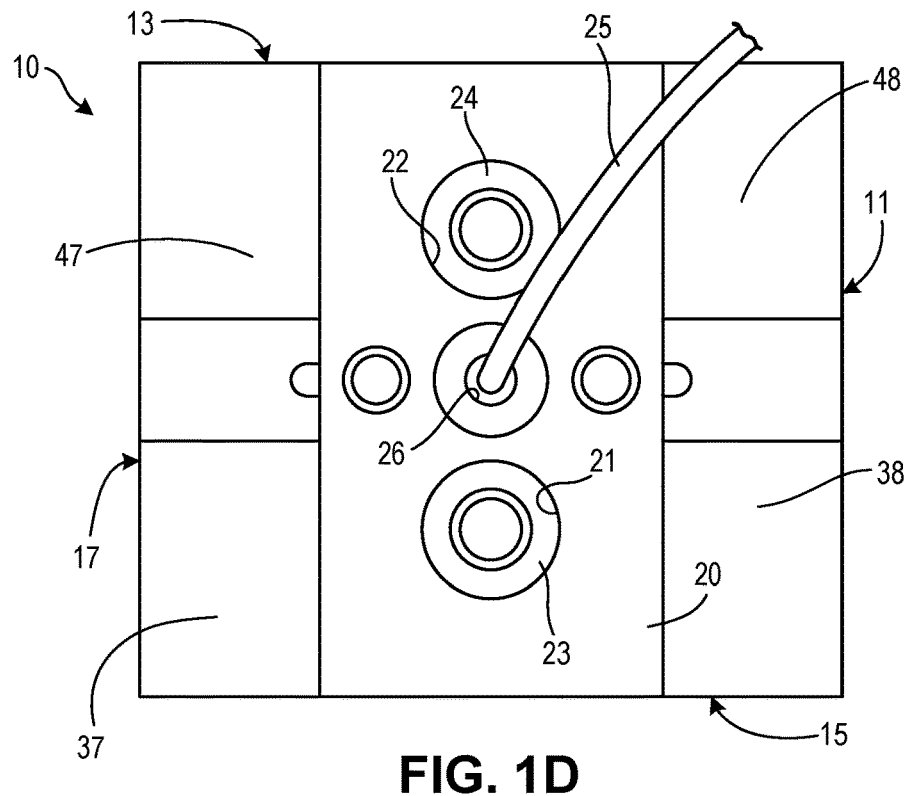
Figure 1E:
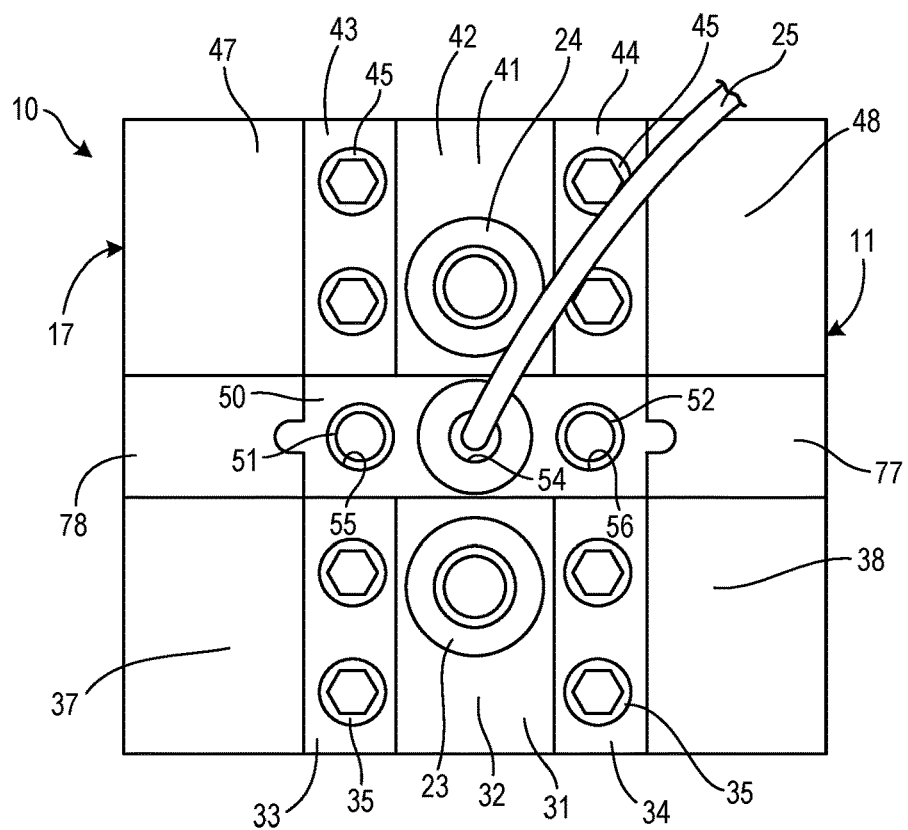
FIG. 1E is a top view of the battery assembly of FIG. 1A, but with a terminal cross-bar removed to show additional details.

FIG. 1D is a top view of the battery assembly 10. A left side 17 is similar in structure to the right side 11. A terminal cross-bar 20 includes openings 21 and 22 through which a rear terminal 23 and a front terminal 24 respectively extend. Terminal cross-bar 20 may be used in assembly and storage of battery assembly 10, but may be removed when the battery assembly 10 is installed for use. Cross-bar 20 may shield the terminals and prevent the terminal assemblies from sliding apart prior to installation of the battery assembly 10 into a larger assembly. A heater wiring harness 25 extends through an opening 26 of the terminal cross-bar 20. FIG. 1E is a top view of the battery assembly 10 with the terminal cross-bar 20 removed to show additional details. The rear terminal 23 is part of a rear terminal assembly 31 that includes a main body 32, a left clamp 33, a right clamp 34, and clamp screws 35. A top portion of a left rear bus strip 37 is secured to the main body 32 by the left clamp 33 and two of the screws 35. A top portion of a right rear bus strip 38 is secured to the main body 32 by the right clamp 34 and two of the screws 35. The front terminal 24 is part of a front terminal assembly 41 that includes a main body 42, a left clamp 43, a right clamp 44, and clamp screws 45. A top portion of a left front bus strip 47 is secured to the main body 42 by the left clamp 43 and two of the screws 45. A top portion of a right front bus strip 48 is secured to the main body 42 by the right clamp 44 and two of the screws 45. A terminal insulating spacer 50 is positioned between the rear terminal assembly 31 and the front terminal assembly 41. Threaded inserts 51 and 52 in holes 55 and 56 of the spacer 50 receive screws that pass through holes in the cross-bar 20 to secure the cross-bar 20 in place. The heater wiring harness 25 extends through a central hole 54 in spacer 50.

Figure 2A:
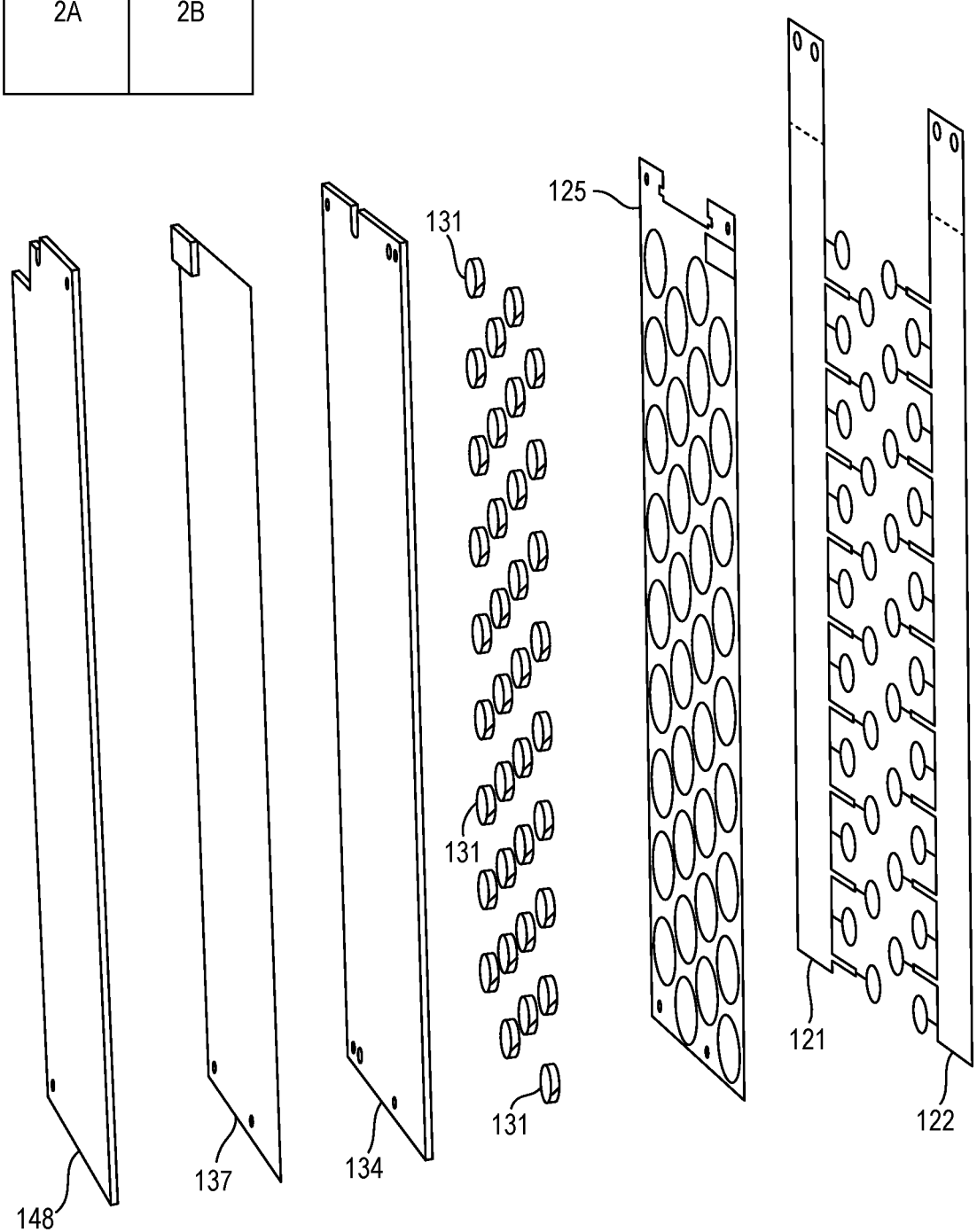
FIGS. 2A and 2B are respective left and right sides of an exploded right rear perspective view of the battery assembly of FIG. 1A.
Figure 2B:
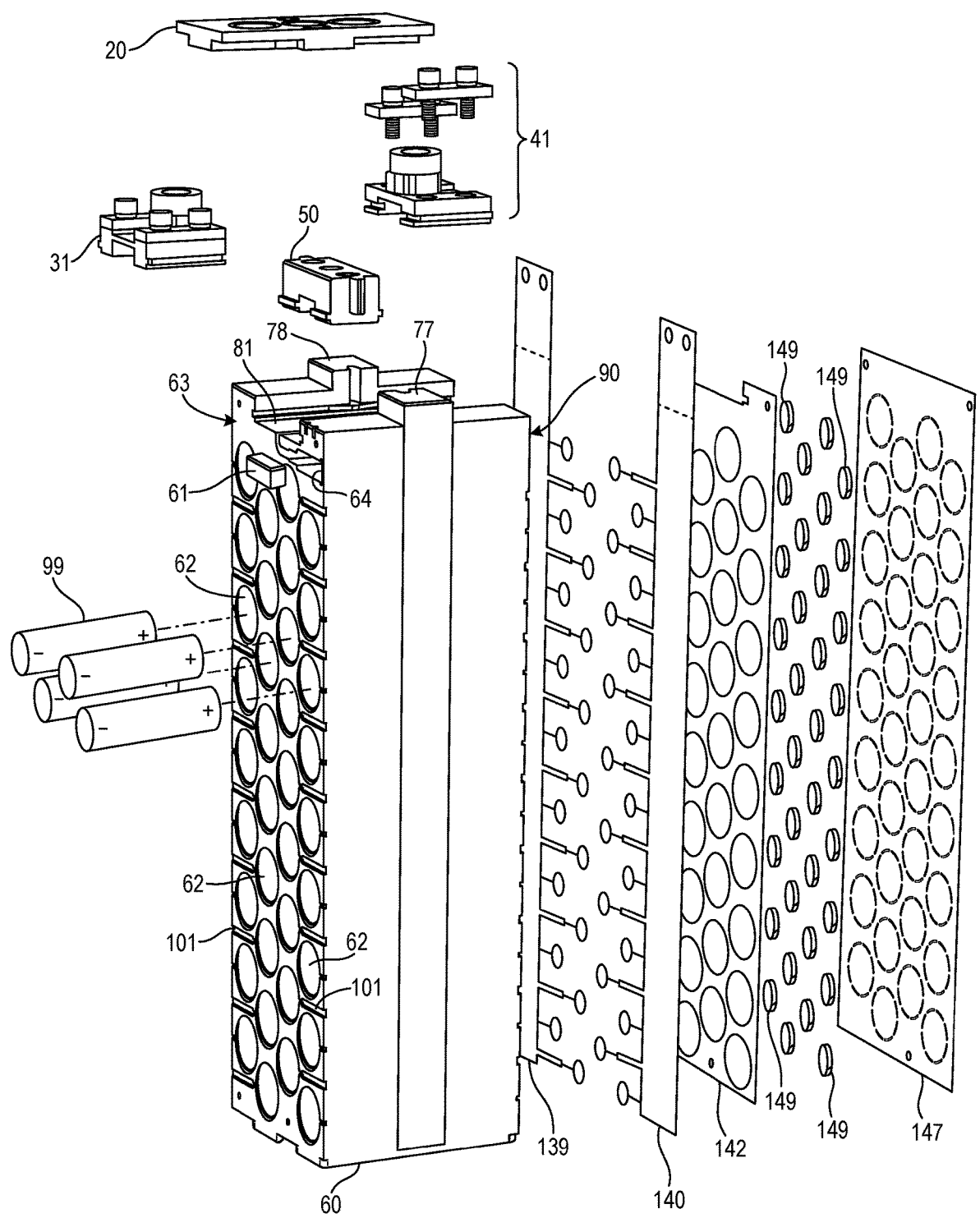

FIGS. 2A and 2B are respective left and right sides of an exploded right rear perspective view of the battery assembly 10. The battery assembly 10 includes a cell array housing 60 (FIG. 2B). The housing 60 includes a plurality of cell receptacles 62 that extend from a rear 63 of the housing 60 to a front 90. Each of the receptacles may receive and hold a battery cell 99. Each of the cells 99 may be, e.g., a COTS lithium-ion cell such as a 3.6 volt (nominal) cylindrical cell having a length of 65 mm and a diameter of 18 mm. Other types of cells, of other sizes and/or voltages, may also or alternatively be used.

In the battery assembly 10, there are thirty-six receptacles 62 arranged in four columns A through D, although other example battery assemblies may have more or fewer receptacles and/or receptacles arranged in a different manner. For convenience, only four cells 99 are shown in FIG. 2B, it being understood that all receptacles 62 may contain a cell 99 in the completed battery assembly 10. Each of the cells 99 may be oriented so that a negative terminal is positioned near a rear end of a corresponding receptacle 62 and a positive terminal is positioned near a front end of the corresponding receptacle 62. In this manner, and as described in more detail below, the rear terminal 23 becomes the negative terminal of the battery assembly 10 and the front terminal 24 becomes the positive terminal of the battery assembly 10. A thermostat 61 may rest in a cavity 64 on the rear 63 of the housing 60.

Located behind the housing 60, and as shown in FIG. 2A, are a left rear conductor sheet 121 and a right rear conductor sheet 122. For convenience, the conductor sheets 121 and 122 are shown in a flat condition in FIG. 2A. In the completed battery assembly 10, portions of the conductor sheets 121 and 122 are folded around the sides and the top of the housing 60, as explained in more detail below. After the cells 99 are secured in the receptacles 62, pads of the conductor sheets 121 and 122 are positioned over rear openings of the receptacles 62 and welded to the rear terminals of the cells 99, and connection branches of the conductor sheets 121 and 122 are recessed in channels formed in the rear 63 of the housing 60. After the pads and connection branches of the conductor sheets 121 and 122 are in place, a layer of adhesive 125 covers the rear of the housing 60. Thermally-conductive gap filler pads 131 (or pads of similar material having low electrical conductivity and good thermal conductivity (e.g., 3 W/m-K or higher)) may be positioned on the pads of the conductor sheets 121 and 122 and the rear ends of the cells 99. A heat spreader plate 134 is located to the rear of, and is in contact with, the gap filler pads 131. A film heater 137 is positioned behind the heat spreader plate 134, and a rear refractory panel 148 is positioned behind the heater 137.

Located in front of the housing 60, and as shown in FIG. 2B, are a left front conductor sheet 139 and a right front conductor sheet 140. The conductor sheets 139 and 140 are shown in a flat condition in FIG. 2B. In the completed assembly 10, portions of the conductor sheets 139 and 140 are folded around the sides and the top of the housing 60, as explained in more detail below. After the cells 99 are secured in the receptacles 62, pads of the conductor sheets 139 and 140 are positioned over front openings of the receptacles 62 and welded to the front terminals of the cells 99, and connection branches of the conductor sheets 139 and 140 are positioned in channels formed in the front 90 of the housing 60. After the pads and connection branches of conductor sheets 139 and 140 are in place, a layer of adhesive 142 may be applied to the front 90 of the housing 60. Mica disks 149 may be glued or otherwise secured in place over front ends of cells 99, to protect adjacent cells from hot debris that may be ejected from a cell that has gone into thermal runaway. A front refractory panel 147 may then be positioned over the adhesive layer 142.

The rear terminal assembly 31 and the front terminal assembly 41 are placed in a channel 81 in the top of the housing 60. The insulating spacer 50 is placed between the terminal assemblies 31 and 41, and the cross-bar 20 is placed over the terminal assemblies 31 and 41 and the spacer 50.

The housing 60 may be molded and/or otherwise fabricated from a solid block of a material into which the receptacles 62 and other features are formed. The material of the housing 60 may be electrically non-conductive and may have thermal characteristics so as to help prevent heat from one receptacle 62 from reaching adjacent receptacles 62. The housing 60 may act as an interstitial matrix that may protect individual cells 99, and that may provide a structure for securing other components. The cells 99 may be restrained within the housing 60 to prevent movement during shock and/or vibration of the battery assembly 10. This restraint may be accomplished using any of various structures. Examples of such structures include C-rings and the use of shoulders formed into the interstitial matrix material, as described below.

Figure 3A:
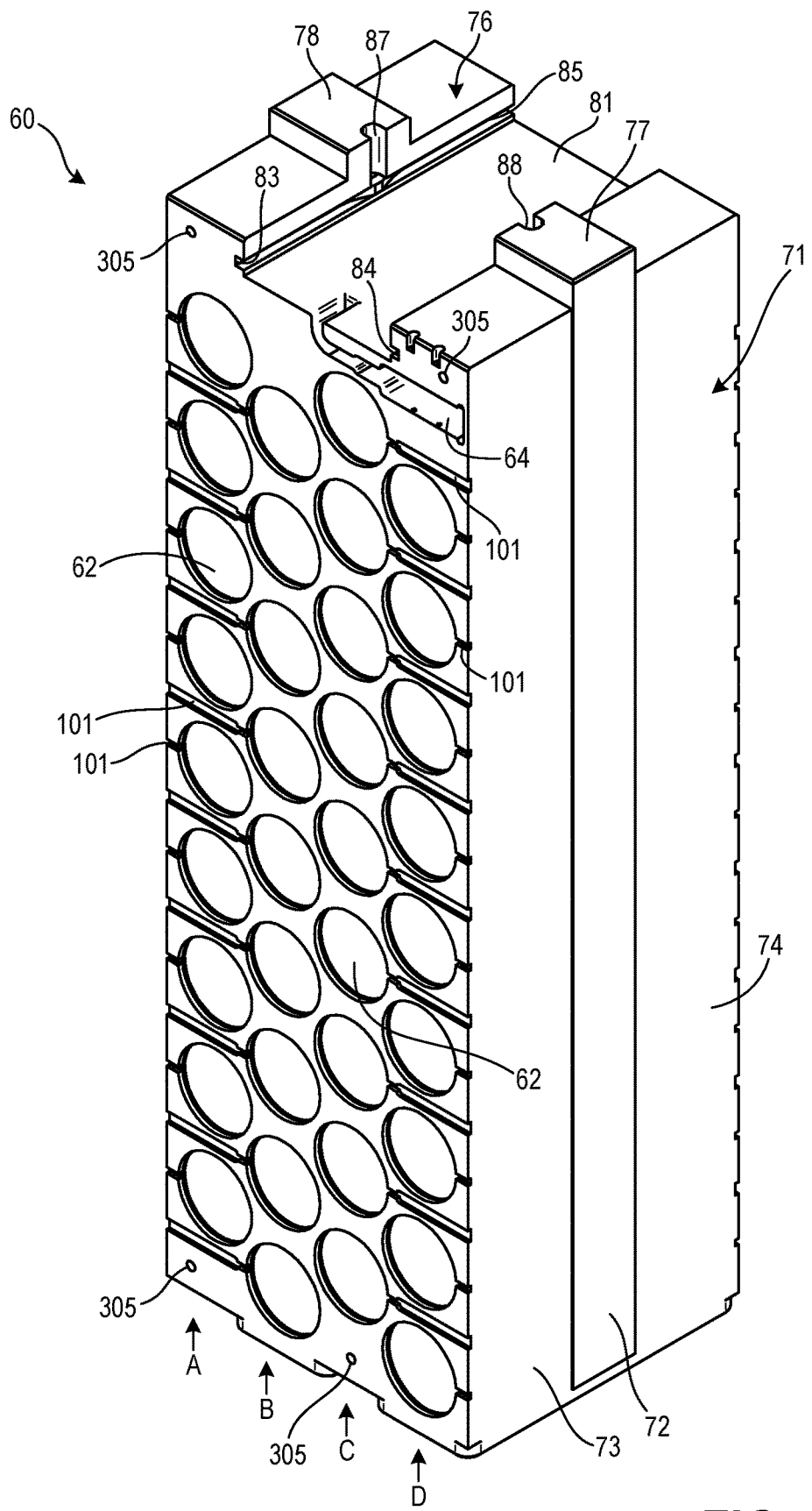
FIG. 3A is a right rear perspective view of a cell array housing of the battery assembly of FIG. 1A.

FIG. 3A is a right rear perspective view of the housing 60. The housing 60 may provide thermal protection to adjacent cells 99 in the event of cell failure. In particular, adjacent cells 99 may be protected from heat generated by a cell 99 that goes into thermal runaway and fails energetically. A lithium-ion cell that fails can produce very high temperatures, e.g., in the range of 1000° C. The interstitial matrix material of the housing 60 and its design may be chosen to protect cells adjacent to a failing cell from this high temperature. In one example, the interstitial matrix may be formed from a thermally insulating material to protect the adjacent cells from the evolved heat until that heat can be dispersed via another heat sink. One example of such a material for the housing 60 is a syntactic foam formed from glass beads embedded in an epoxy resin, although other materials may also or alternatively may be used. In other examples, the interstitial matrix may be formed from a thermally conductive material to rapidly disperse heat to the broader assembly, or from a thermally absorbent material that can absorb heat. The housing 60 may also be electrically non-conductive so as to provide electrical isolation of the cells 99, the conductive sheets 121, 122, 139, and 140, and other components. This can be achieved by using a housing material that is not electrically conductive (e.g., the aforementioned syntactic foam) and/or by coating an electrically-conductive housing material to electrically insulate the cells 99, the conductive sheets 121, 122, 139, and 140, and/or other components from the housing 60 material.

The housing 60 may include front channels 102 (see FIG. 3C) and rear channels 101 into which connection branches of the conductive sheets 121, 122, 139, and 140 are recessed. This facilitates protecting those branches from hot debris that may be ejected from a cell that has gone into thermal runaway. The housing 60 material may also help prevent mechanical failure during a cell thermal runaway, and thereby help prevent exposure of neighboring cells to the heat and ejecta from a failing cell. This may be particularly beneficial for high energy cells that can experience sidewall failures. The housing 60 material may also be used to anchor components (e.g., the terminal assemblies), and to anchor the battery assembly 10 to other assemblies.

A right side 71 of the housing 60 includes a ridge 72 that defines a right rear recess 73 and a right front recess 74. In the completed battery assembly 10, the right rear bus strip 38 may be folded around the right side 71 and rest within the recess 73. Similarly, the right front bus strip 48 may be folded around the right side 71 and rest within the recess 74. The ridge 72 extends upward to a top 76 of the housing 60 and forms the right side of a right side post 77. The depth of the recesses 73 and 74 relative to the ridge 71 may be approximately equal to the thickness of the material from which the conductor sheets 122 and 140 are formed, thereby allowing the bus strips 38 and 48 of those sheets to be approximately flush with the ridge 72.

A channel 81 is formed in the top 76 of the housing 60. The terminal assemblies 31 and 41 rest within the channel 81. The insulating spacer 50 rests between the right side post 77 and a left side post 78, and partially within the channel 81. A left rear groove 83 and a right rear groove 84 in the walls of the channel 81 receive corresponding ridges of the main body 32 of the terminal assembly 31. A left front groove 85 and a right front groove 86 (FIG. 3C) in the walls of the channel 81 receive corresponding ridges of the main body 42 of the terminal assembly 41. Slots 87 and 88 in posts 78 and 77, respectively, receive ridges on sides of the insulating spacer 50. To provide additional strength, the slot 87 may not extend to the floor of channel 81 and the grooves 83 and 85 may terminate to the rear and to the front, respectively, of the slot 87. Similarly, the slot 88 may not extend to the floor of channel 81 and the grooves 84 and 86 may terminate to the rear and to the front, respectively, of the slot 88.

The rear channels 101 are formed in the rear 63 of the housing 60. As to each of the receptacles 62 in the two right side columns C and D of receptacles 62, a separate channel 101 extends from the rear opening of the receptacle 62 to the right rear recess 73. As to each of the receptacles 62 in the two left side columns A and B of receptacles 62, a separate channel 101 extends from the rear opening of the receptacle 62 to a left rear recess 67 (FIG. 3E). The cavity 64 in the upper right region of the rear 63 of the housing 60 holds the thermostat 61 (FIG. 2B) in the completed battery assembly 10.

FIG. 3B is a rear view of the housing 60. FIG. 3C is a front view showing the front 90 of the housing 60. The front channels 102 are formed in the front 90. As to each of the receptacles 62 in the two right side columns C and D of receptacles 62, a separate channel 102 extends from the front opening of the receptacle 62 to the right front recess 74. As to each of the receptacles 62 in the two left side columns A and B of receptacles 62, a separate channel 102 extends from the front opening of the receptacle 62 to a left front recess 68 (FIG. 3E).

Figure 3D:
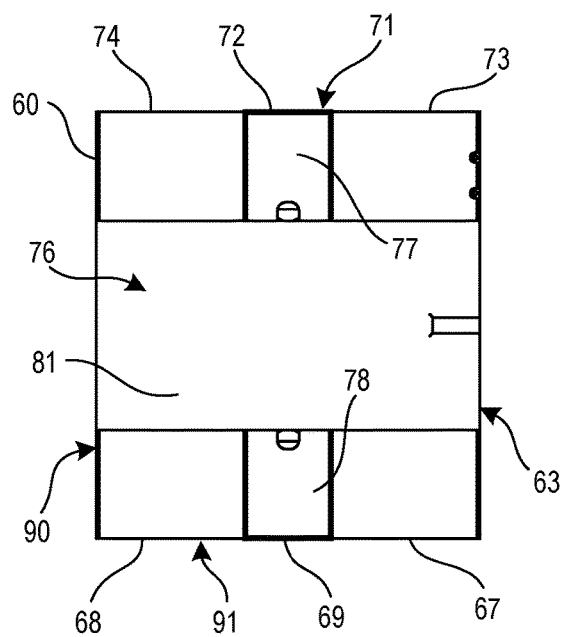
Figure 3E:
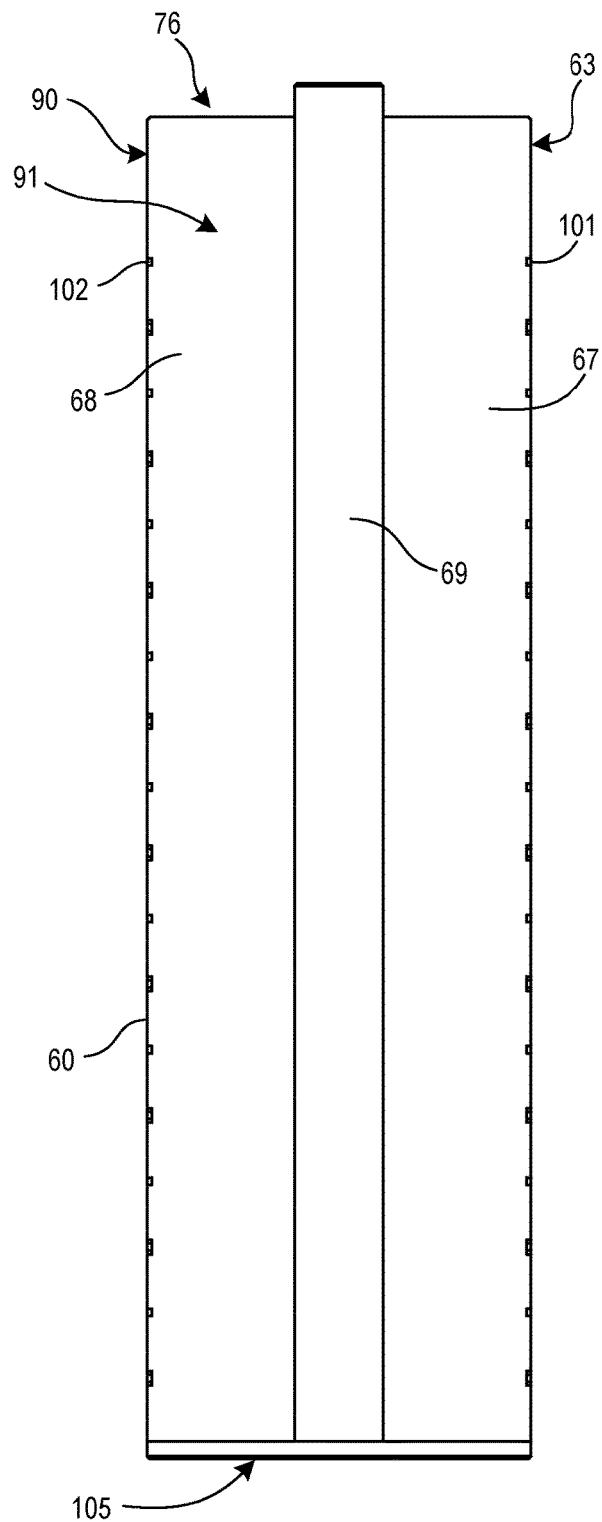

FIG. 3D is a top view of the housing 60. FIG. 3E is a left side view of the housing 60 showing the housing left side 91. Similar to the right side 71, the left side 91 includes a ridge 69 that defines the left rear recess 67 and the left front recess 68. In the completed battery assembly 10, the left rear bus strip 37 may be folded around the left side 91 and rest within the recess 67. Similarly, the left front bus strip 47 may be folded around the left side 91 and rest within the recess 68. The ridge 69 extends upward to the top side 76 and forms the left side of the left side post 78. The depth of the recesses 67 and 68 relative to the ridge 69 may be approximately equal to the thickness of the material from which the conductor sheets 121 and 139 are formed, thereby allowing the bus strips 37 and 47 of those sheets to be approximately flush with the ridge 69.

FIG. 3F is a bottom view showing a bottom 105 of the housing 60. A threaded insert, not shown, may be secured in an opening 103 in the bottom 105. That insert may provide a means for securing a bottom end of the battery assembly 10 in place. Alignment pads 104 may be formed in the bottom 105. The pads 104 may provide additional means for securing the battery assembly 10 in place, e.g., the pads 104 may rest in corresponding channels of a bracket or other structure into which the battery assembly 10 may be placed. The offset orientation of pads 104 on bottom 105 helps to avoid installation of the battery assembly 10 in an incorrect orientation when the battery assembly 10 is put into use, and thereby helps minimize the risk of reversing positive and negative terminals from their intended positions.

FIG. 3G is a cross-sectional view taken from the sectioning plane indicated in FIG. 3B. FIG. 3G1 is an enlargement of a first indicated portion of FIG. 3G and shows additional details of the front ends of receptacles 62. The front ends of the other receptacles 62 have a similar structure. The front end of each receptacle 62 includes a shoulder 161 and a front opening 162. A front peripheral portion of a cell 99 rests against the shoulder 161, thereby restraining the cell 99 from forward movement. The front opening 162 exposes a terminal of the cell for connection to a pad of a conductor sheet. In the example of the battery assembly 10, a positive terminal of a cell 99 is exposed through each front opening 162. Also visible in FIG. 3G1 are some of the front channels 102. Each of the front channels 102 extends into one of the front openings 162.

FIG. 3G2 is an enlargement of a second indicated portion of FIG. 3G and shows additional details of the rear ends of receptacles 62. The rear ends of the other receptacles 62 have a similar structure. The rear end of each receptacle 62 includes a rear opening 164. Each of the receptacles 62 also includes a groove 165, formed around part or all of the periphery of the wall of the receptacle 62, located near the rear opening 164 of that receptacle 62. During fabrication of the battery assembly 10, and after a cell 99 has been placed into a receptacle 62, a compressible C-ring is inserted in, and allowed to expand into, the groove 165 of that receptacle. The C-ring then extends slightly into the receptacle 62 and forms a stop against which a rear peripheral portion of the cell 99 abuts. In this manner, the cell 99 is retained within the receptacle 62. The portion of the rear opening 164 not covered by the C-ring exposes a terminal of the cell 99 for connection to a pad of a conductor sheet. In the example of the battery assembly 10, a negative terminal of a cell 99 is exposed through the rear opening 164. Also visible in FIG. 3G2 are some of the rear channels 101. Each of the rear channels 101 extends into one of the rear openings 164.

As seen in FIG. 3G1, the shoulders 161 position the front ends of the cells 99 rearward of the bottoms of the front channels 102. This permits fuse portions of connection branches 173 and 174 (described in connection with FIG. 5A) to be suspended in open air, thereby facilitating proper fuse opening. As seen in FIG. 3G2, the grooves 165 are positioned so that front sides of C-rings will position the rear ends of the cells 99 forward of the bottoms of the rear channels 101. This permits fuse portions of connection branches 169 and 170 (described in connection with FIG. 4A) to be suspended in open air, thereby facilitating proper fuse opening.

Figure 3H:
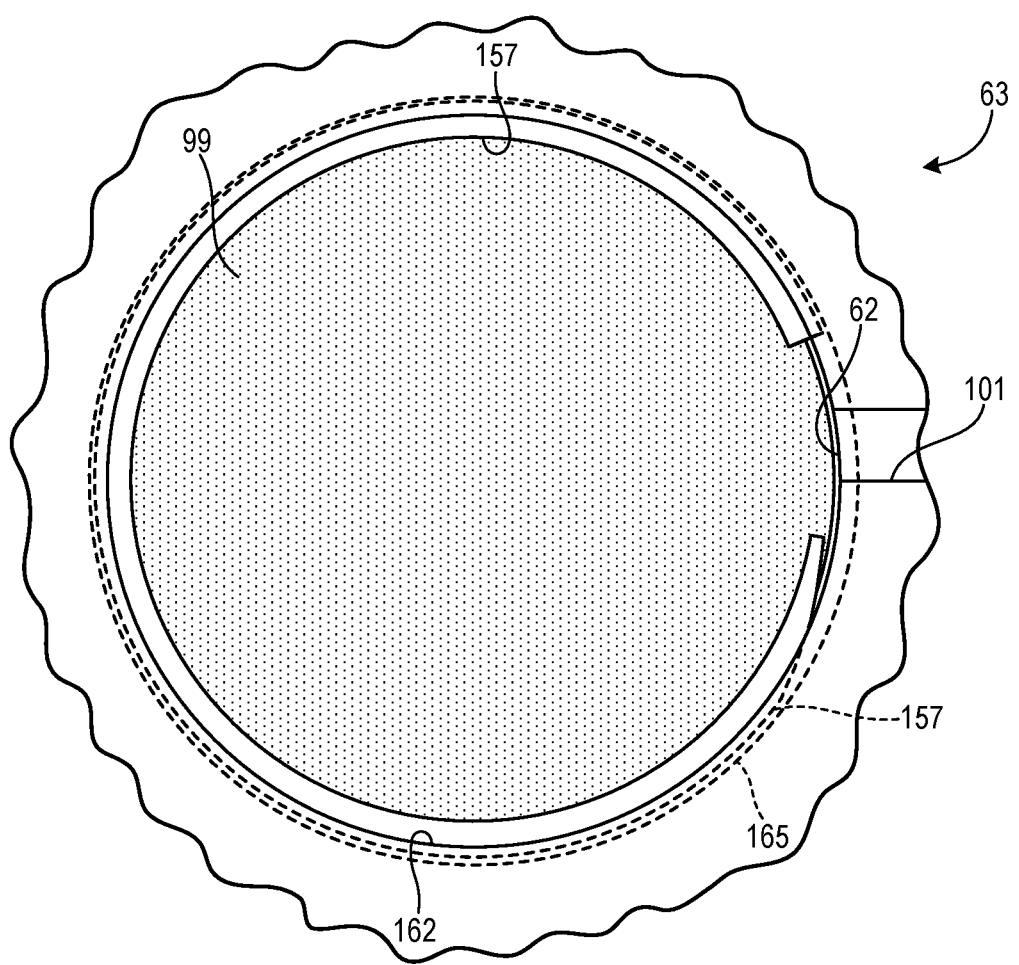
FIG. 3H is an enlarged rear view of a portion of the cell array housing of FIG. 3A.

FIG. 3H is an enlarged rear view of a portion of the housing 60 and shows an example of a C-ring 157 installed in one of the cell receptacles 62. For purposes of illustration and to distinguish from other elements shown in FIG. 3H, the exposed portion of a rear face of a battery cell 99 in a receptacle 62 is shown with stippling. As seen in FIG. 3H, the C-ring 157 extends over peripheral end regions of the cell 99 to prevent that cell 99 from passing through the rear opening 164. If desired, the C-ring 157 can be removed to allow replacement of a cell 99. C-rings placed in the other cell receptacles 62 may have a structure and an orientation similar to what is shown in FIG. 3H.

Figures 4A, 4B:
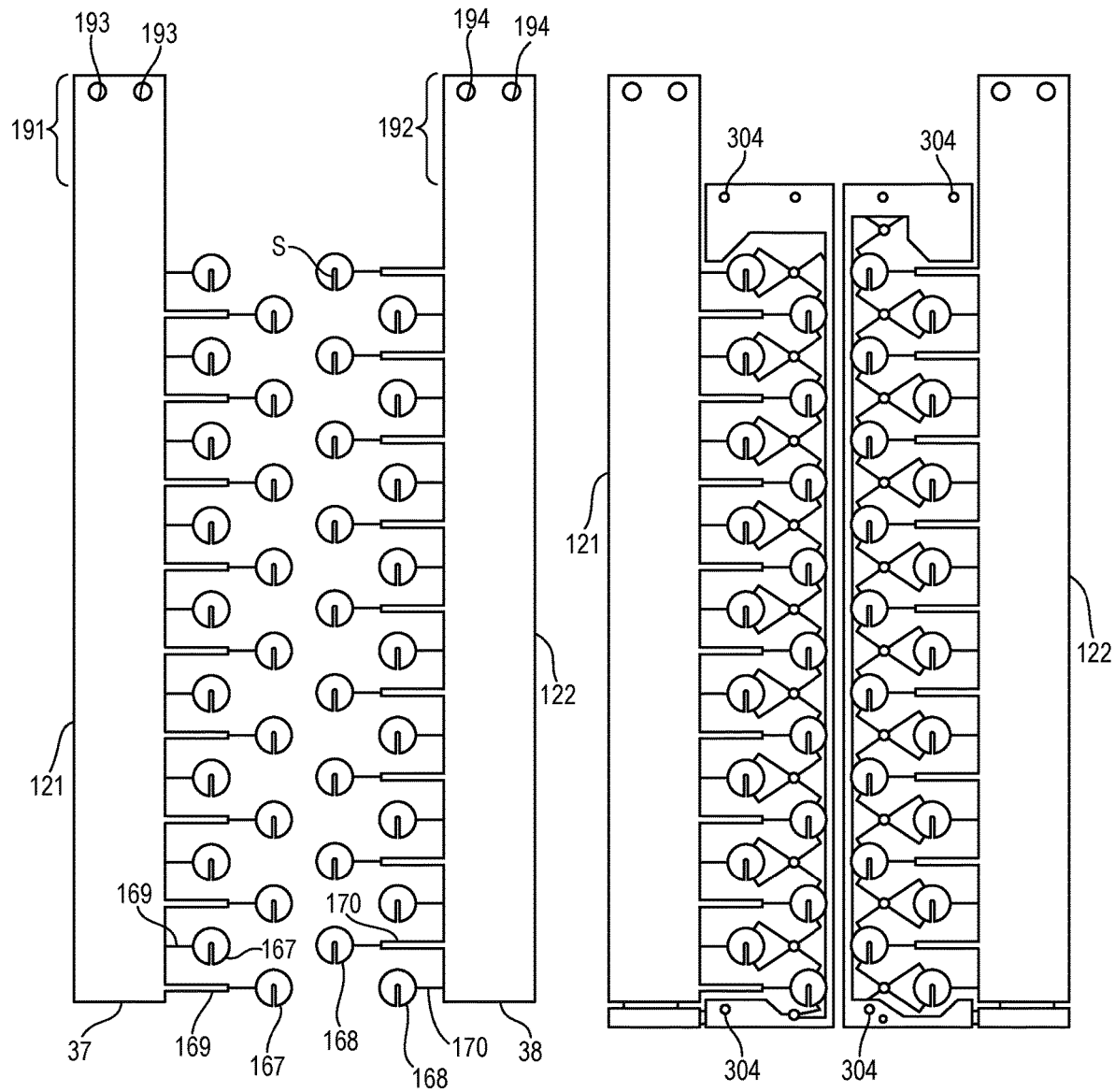
FIG. 4A shows left and right rear conductor sheets of the battery assembly of FIG. 1A.
FIG. 4B shows the left and right rear conductor sheets of FIG. 4A prior to removal of assembly/handling aids.

FIG. 4A is a rear view of the left rear conductor sheet 121 and the right rear conductor sheet 122 in a flattened condition. The left rear conductor sheet 121 includes the left rear bus strip 37 and a plurality of left rear pads 167. Each of the left rear pads 167 is connected to the left rear bus strip 37 by a connection branch 169. At least a portion of each of the connection branches 169 is reduced in width so as to form an in-line fuse. The right rear conductor sheet 122 includes the right rear bus strip 38 and a plurality of right rear pads 168. Each of the right rear pads 168 is connected to the right rear bus strip 38 by a connection branch 170. At least a portion of each of the connection branches 170 is reduced in width so as to form an in-line fuse. The widths of the in-line fuse portions may be selected based on desired opening current and material properties of the material used for the conductor sheets 121 and 122. Each of left rear pads 167 and right rear pads 168 may have a slot s formed therein to facilitate heat dispersion during the spot welding process of those pads to rear ends of cells 99. For convenience, slots s are not shown in FIG. 2A.

Figures 5A, 5B:
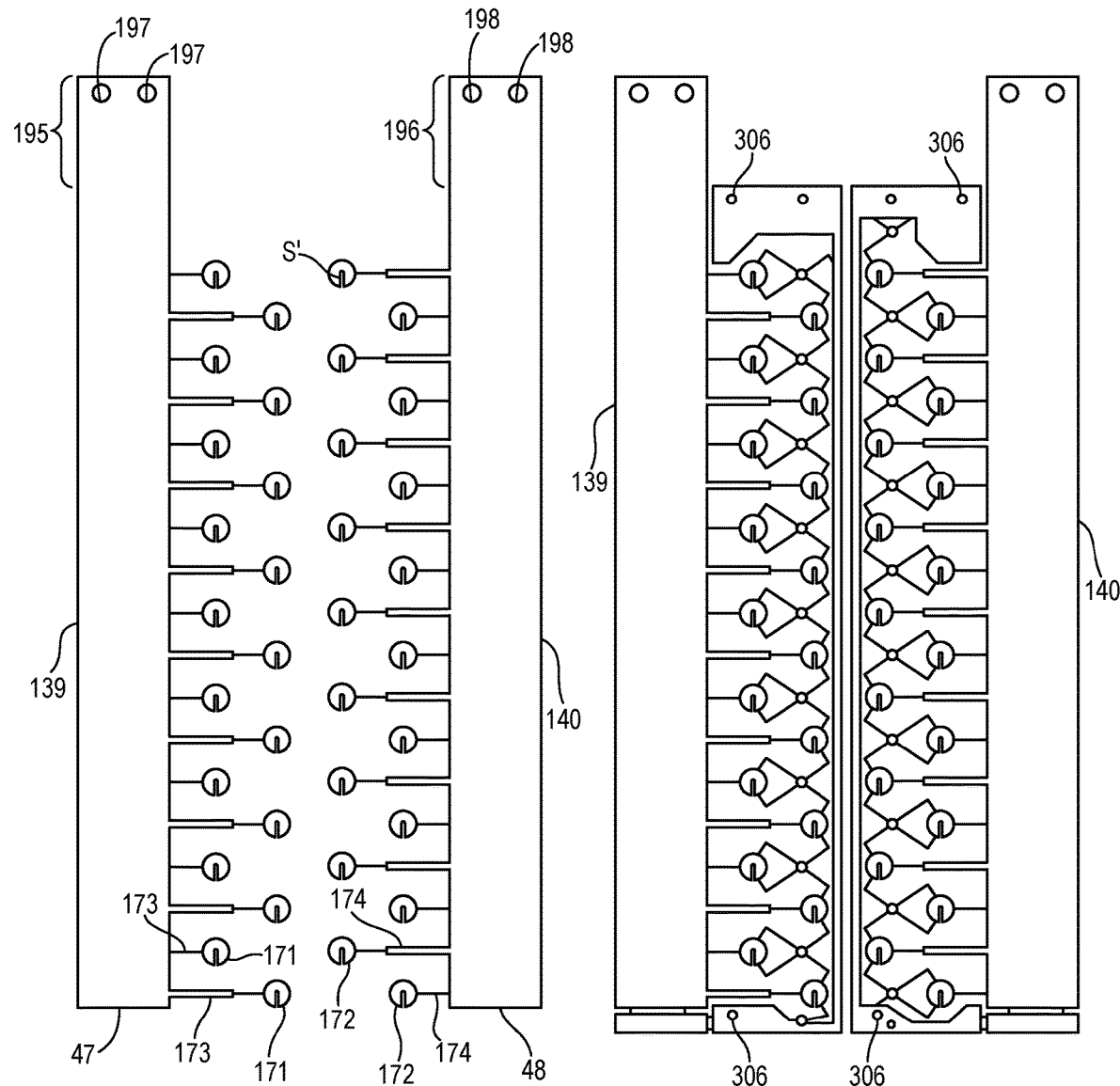
FIG. 5A shows left and right front conductor sheets of the battery assembly of FIG. 1A.
FIG. 5B shows the left and right front conductor sheets of FIG. 5A prior to removal of assembly/handling aids.

FIG. 5A is a rear view of the left front conductor sheet 139 and the right front conductor sheet 140 in a flattened condition. The left front conductor sheet 139 includes the left front bus strip 47 and a plurality of left front pads 171. Each of the left front pads 171 is connected to the left front bus strip 47 by a connection branch 173. At least a portion of each of the connection branches 173 is reduced in width so as to form an in-line fuse. The right front conductor sheet 140 includes the right front bus strip 48 and a plurality of right front pads 172. Each of the right front pads 172 is connected to the right front bus strip 48 by a connection branch 174. At least a portion of each of the connection branches 174 is reduced in width so as to form an in-line fuse. The widths of the in-line fuse portions may be selected based on desired opening current and material properties of the material used for the conductor sheets 139 and 140. Each of left front pads 171 and right front pads 172 may have a slot s' formed therein to facilitate heat dispersion during the spot welding process of those pads to front ends of cells 99. For convenience, slots s' are not shown in FIG. 2B. One non-limiting example of material from which conductor sheets 121, 122, 139, and 140 may be formed is nickel having a thickness of 0.010 inches (10 mils).

In at least some examples, the material of the conductor sheets 121, 122, 139, and 140 may be relatively thin and damaged if improperly handled. To ease handling and installation of those conductor sheets in the battery assembly 10, conductor sheets 121, 122, 139, and 140 may be initially fabricated with assembly/handling aids connecting various portions of the conductor sheets to provide additional strength. After pads 167, 168, 171, and 172 are welded or otherwise attached to terminals of the cells 62, and after connection branches 169, 170, 173, and 174 are recessed into channels 101 and 102, the assembly/handling aids can be cut away with wire cutters or other hand tools. FIG. 4B is a rear view of left rear conductor sheet 121 and right rear conductor sheet 122 with assembly/handling aids in place. FIG. 5B is a rear view of left front conductor sheet 139 and right front conductor sheet 140 with assembly/handling aids in place.

Figure 6A:
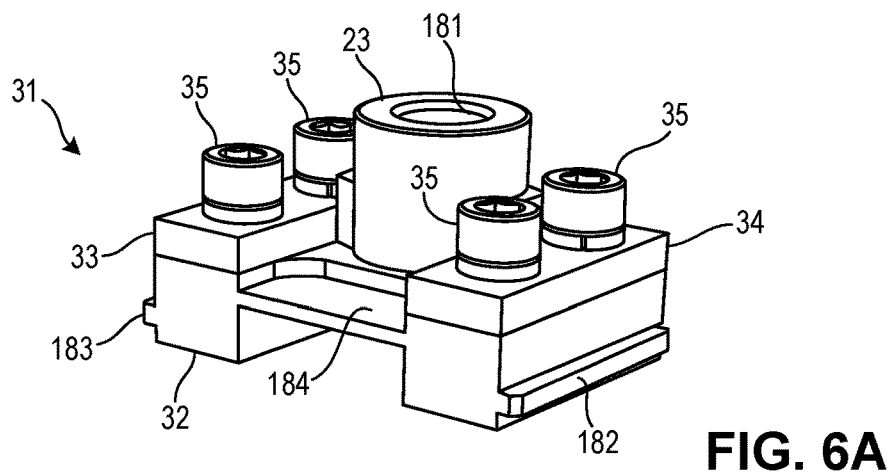
FIG. 6A is a rear perspective view of a rear terminal assembly of the battery assembly of FIG. 1A.

FIG. 6A is a rear perspective view of the rear terminal assembly 31. The main body 32 of the rear terminal assembly 31, which may be machined or otherwise fabricated from copper or other conductive material (and/or may be plated with nickel or other conductive material), includes the integral rear terminal 23. A hole 181 in the terminal 23 may be threaded (or may include a threaded insert) for connection of a battery lead. The left clamp 33 and the right clamp 34 are secured to the main body 32 with screws 35. Threaded ends of the screws 35 are received in corresponding threaded holes (not visible in FIG. 6A) (or in threaded inserts within those holes) in the main body 32. The rear terminal assembly 31 may be installed in the housing 60 by sliding the rear terminal assembly 31 into the channel 81 from the rear, with ridges 183 and 182 respectively fitting into the grooves 83 and 84, and with the terminal 23 oriented toward the front 90 of the housing 60 and the web 184 oriented toward the rear 63 of the housing 60.

Figure 6B:
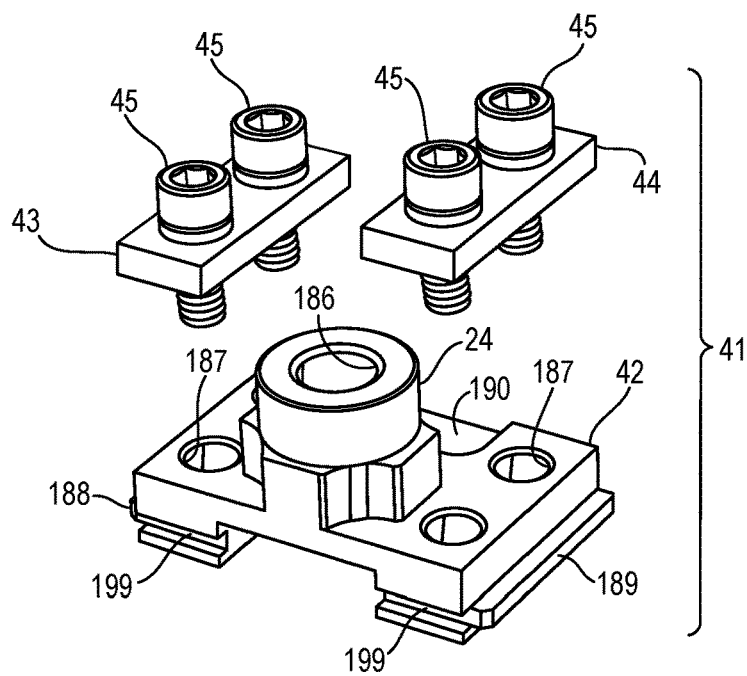
FIG. 6B is an exploded right rear perspective view of a front terminal assembly of the battery assembly of FIG. 1A.

FIG. 6B is an exploded right rear perspective view of the front terminal assembly 41. The front terminal assembly 41 and the rear terminal assembly 31 may be identical in structure and material. However, the front terminal assembly 41 may be installed in the housing 60 so as to have an orientation that is rotated 180° relative to the orientation of the installed rear terminal assembly 31. The main body 42 of the front terminal assembly 41 includes the integral front terminal 24. A hole 186 in the terminal 24 may be threaded (or may include a threaded insert) for connection of a battery lead. The left clamp 43 and the right clamp 44 are secured to the main body 42 with screws 45. Threaded ends of the screws 45 are received in corresponding threaded holes 187 (or in threaded inserts within holes 187) in the main body 42. The front terminal assembly 41 may be installed in the housing 60 by sliding the front terminal assembly 41 into the channel 81 from the front 90 of the housing 60, with ridges 188 and 189 respectively fitting into grooves 85 and 86, and with the terminal 24 oriented toward the rear 63 of the housing 60 and the web 190 oriented toward the front 90 of the housing 60.

Figure 7:
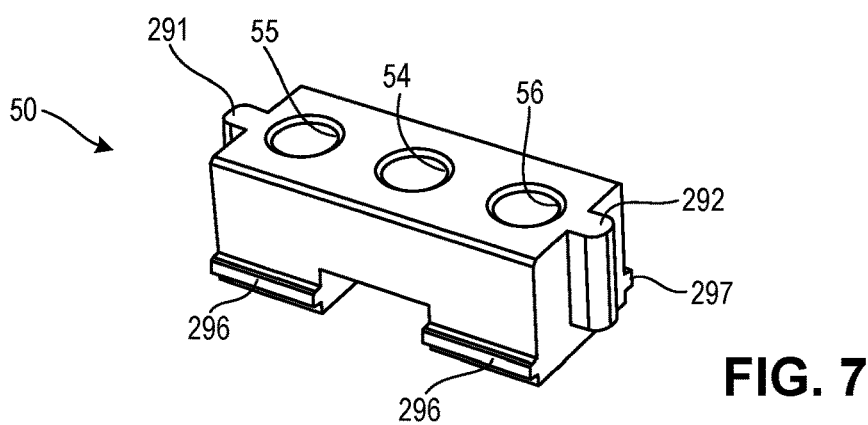
FIG. 7 is a rear perspective view of a terminal insulating spacer of the battery assembly of FIG. 1A.

FIG. 7 is a rear perspective view of the terminal insulating spacer 50. A non-limiting example of a material from which the spacer 50 can be machined or otherwise formed is an acetal homopolymer resin such as that sold under the trade name DELRIN. Other strong, non-conductive materials may be used. The structure of the spacer 50 may be symmetric about a vertical plane passing lengthwise through the axial centerlines of the holes 55, 54, and 56. The spacer 50 may be installed in the housing 60 by sliding the spacer 50 down between the posts 78 and 77, with the ridges 291 and 292 respectively fitting within the slots 87 and 88. The spacer 50 may be installed in the housing 60 before the terminal assemblies 31 and 41. When the rear terminal assembly 31 is installed, grooves on the front of the rear terminal assembly 31 that are similar to grooves 199 on the rear of the front terminal assembly 41 receive ridges 296 on the rear of the spacer 50. When the front terminal assembly 41 is installed, the grooves 199 on the rear of the front terminal assembly 41 receive ridges 297 on the front of the spacer 50. The holes 55 and 56 may include threaded metal inserts 51 and 52 (not shown in FIG. 7) to receive bolts used to secure the cross-bar 20.

Figure 8A:
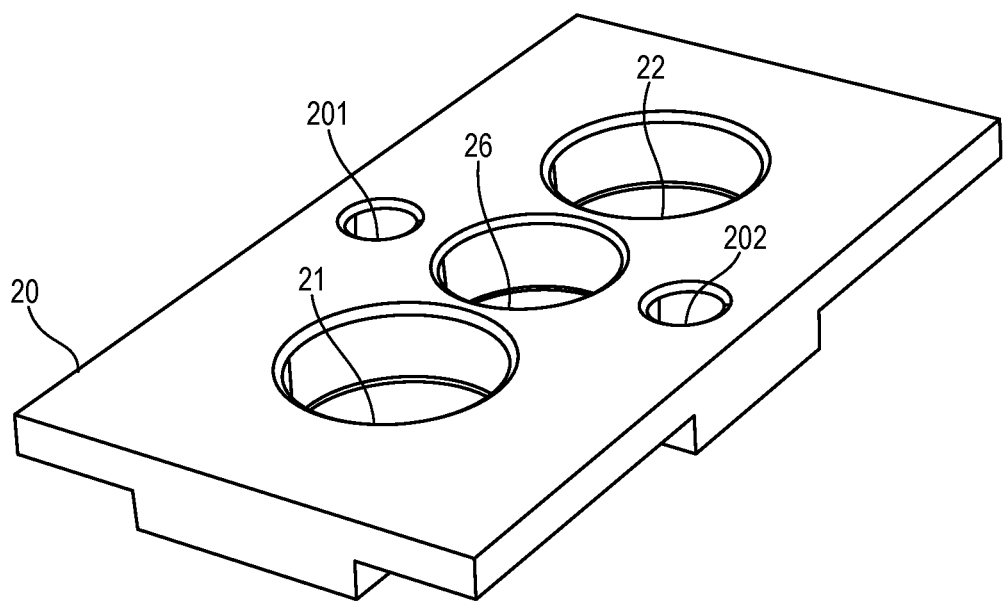
FIG. 8A is a right rear top perspective view of the terminal cross-bar of the battery assembly of FIG. 1A.
Figure 8B:
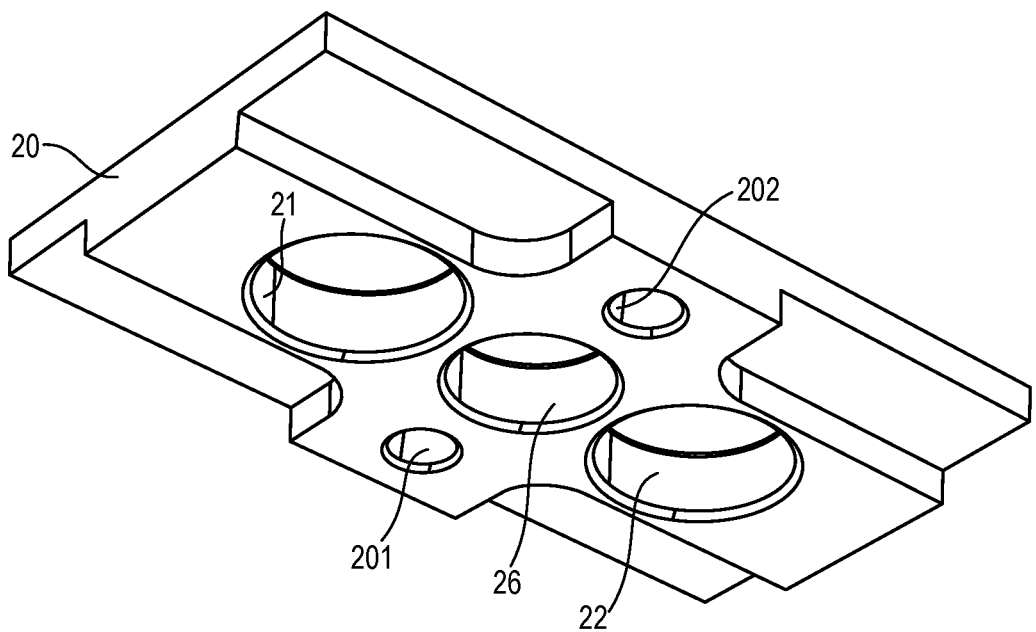
FIG. 8B is a right rear bottom perspective view of the terminal cross-bar of FIG. 8A.

FIG. 8A is a right rear top perspective view of the terminal cross-bar 20. FIG. 8B is a right rear bottom perspective view of the terminal cross-bar 20. A non-limiting example of a material from which the cross-bar 20 can be machined or otherwise formed is an acetal homopolymer resin. When installed in the battery assembly 10, the rear terminal 23 extends through the hole 21 in the cross-bar 20, and the front terminal 24 extends through the hole 22. Fasteners (not shown) may then extend through the holes 201 and 202 from the top side of the cross-bar and into the threaded inserts 51 and 52 (FIG. 1E) in the holes 55 and 56 of the spacer 50. The holes 201 and 202 may include internal shoulders against which caps of the fasteners may rest to hold the cross-bar 20 in place. The heater wiring harness 25 (FIGS. 1D and 1E) may extend through the hole 54 in the spacer 50 and the hole 26 in the cross-bar 20.

Figure 9:
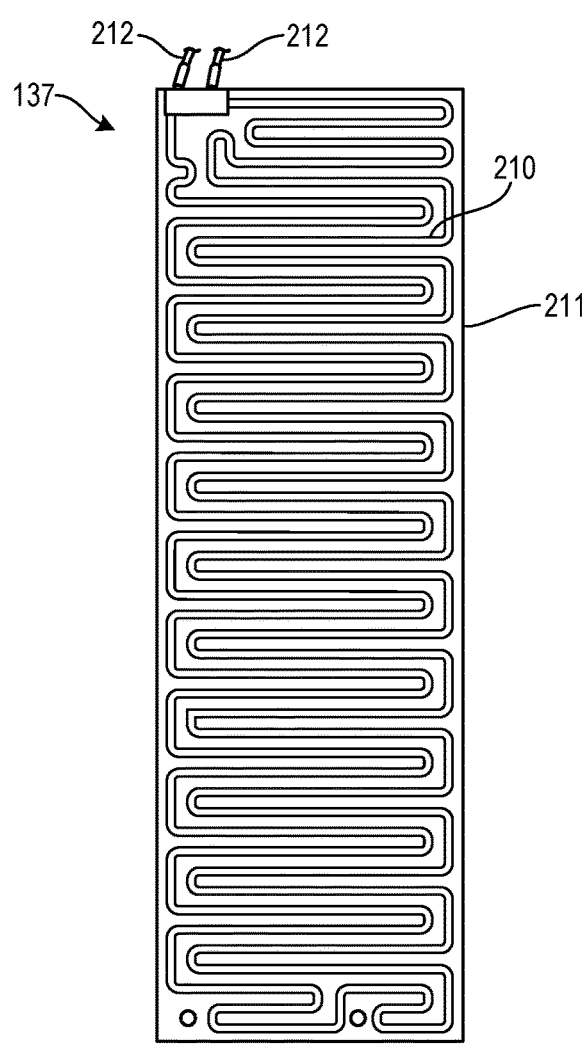
FIG. 9 is a rear view of a film heater of the battery assembly of FIG. 1A.

FIG. 9 is a rear view of the film heater 137. The heater 137 may comprise a thin metal foil trace 210 (e.g., 0.001 inch thick nickel base alloy or other metal) that extends in a continuous path covering most of the surface area of the heater. The foil trace may be laminated onto a flexible non-conducting substrate 211 (e.g., silicone, Kapton). Power leads 212 may be attached to opposite ends of the trace. Heaters such as heater 137 are commercially available according to desired specifications from, e.g., Tempco Electric Heater Corporation of Wood Dale, Ill., US. An example of specifications for the heater 137 for the battery assembly 10 may include conductive traces on a Kapton polyimide film laminate with a pressure-sensitive adhesive layer on one side, approximately 3 inches by 9 inches by 0.015 inches, with a 55 watt capacity at 32 volts DC.

Figure 10:
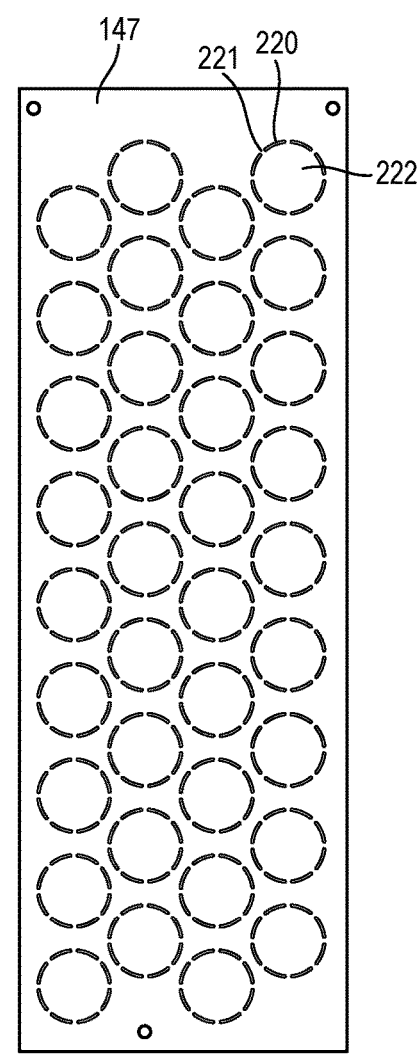
FIG. 10 is a front view of a front refractory panel of the battery assembly of FIG. 1A.

FIG. 10 is a front view of the front refractory panel 147. One example of a material from which the panel 147 may be formed is mica (e.g., phlogopite and amber mica in a silicone resin binder) and having a thickness of 0.005 inches to 0.025 inches. The front refractory panel 147 includes a plurality of weakened regions 220, each of which corresponds to and is positioned over one of the front openings 162 of the housing 60 in the completed battery assembly 10. Each of the weakened regions 220 may comprise a plurality of arcuate perforations that extend through the entire thickness of the panel 147, that surround a break-out portion 222, and that leave a small number of connection tabs 221 that connect the break-out portion 222 to the remainder of the panel 147. Many COTS lithium ion cells include a vent on the positive terminal end. In the event of thermal runaway or other failure, material is typically ejected from that vent. In the event of a thermal runaway or other failure of a cell 99 of the battery assembly 10, the break-out portion 222, circumscribed by the weakened region 220 corresponding to that cell 99 may be blown away. This permits ejecta from the failing cell to escape from the battery assembly 10 and minimizes the risk of that ejecta affecting other cells.

The rear refractory panel 148 (FIG. 2A) may be similar to the front refractory panel 147 in material and structure, but may lack weakened regions such as weakened regions 220.

Figure 11A:
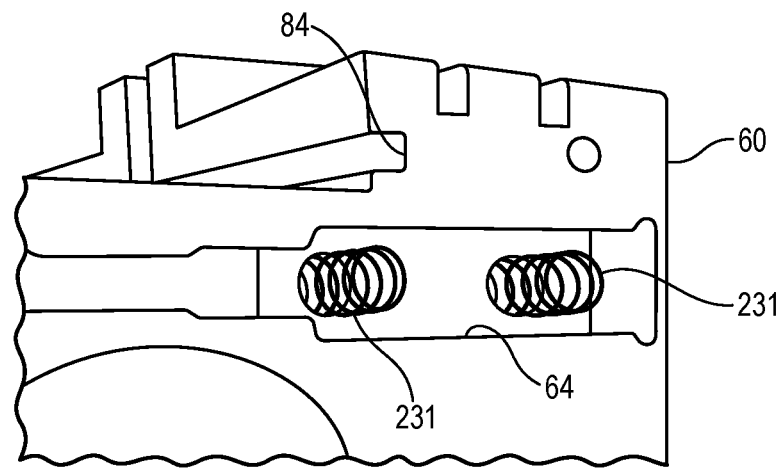
FIG. 11A shows a thermostat cavity of the cell array housing of FIG. 3A.
Figure 11B:
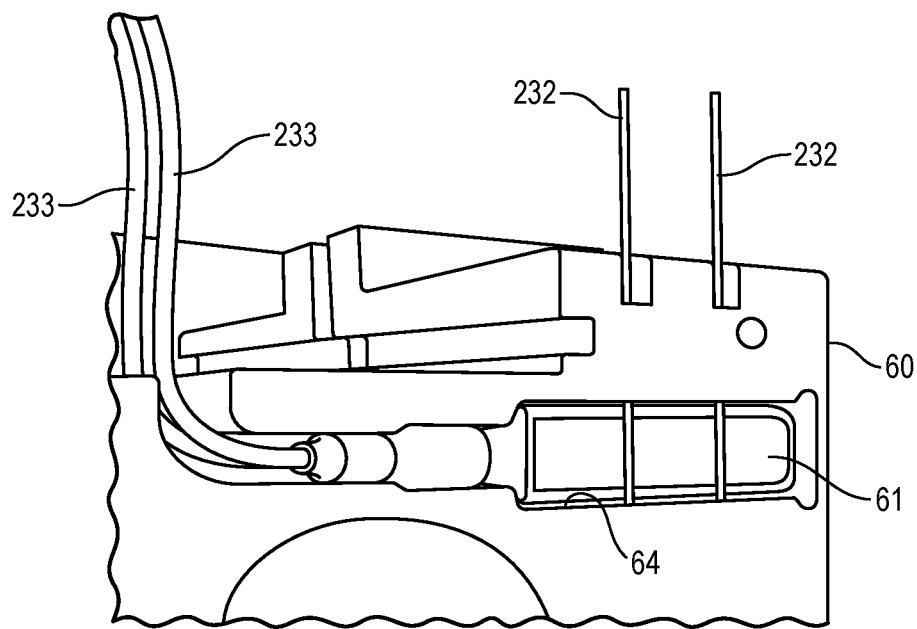
FIG. 11B shows the thermostat cavity of FIG. 11A after installation of a thermostat.

FIG. 11A is a left rear perspective view of the cavity 64, in the housing 60, that receives the thermostat 61. Two springs 231 may be located in the cavity 64 and positioned to bias the thermostat 61, once installed, to the rear. Biasing the thermostat 61 to the rear allows for more accurate sensing of the temperature of the heat spreader plate 134, and thus more accurate control of the heater 137. FIG. 11B is another left rear perspective view of the cavity 64 after the thermostat 61 has been installed, but before installation of other components on the rear 63 of the housing 60. Two pins 232 extend through vertical holes in the housing 60 and may be used to temporarily retain the thermostat 61 in position during assembly. After other components are secured to the rear 63 of the housing 60, the pins 232 may be removed. One non-limiting example of a product that may be used for the thermostat 61 is available as model number TH100 from Minco Products, Inc. of Minneapolis, Minn., US. The thermostat 61 may be connected in series with the heater 137. In particular, one of the leads 233 of the thermostat 61 may be connected to one of the leads 212 of the heater 137. Those connected leads may then be covered (to prevent shorting) and positioned under the terminal assemblies 31 and 41 and the spacer 50. The other lead 233 of the thermostat 61, together with the other lead 212 of the heater 137, may be wrapped to form the heater wiring harness 25. The heater wiring harness 25 may then be routed under the rear terminal assembly 31, under the spacer 50, through the hole 54 in the spacer 50, and through the hole 26 in the cross-bar 20.

An example procedure for assembling the battery assembly 10 is described below. One or more steps may be performed in different order(s), and/or other changes may be made to the procedure.

The housing 60 may be positioned horizontally on a non-conducting surface so that the rear 63 of housing 60 is facing up. A cell 99 may then be inserted, positive terminal first, into each receptacle 62 through its rear opening 164. A C-ring may then be placed into each of the grooves 165 to retain the cells 99 in the receptacles 62.

The housing 60 may then be flipped so that the front 90 is facing upward. The left front conductor sheet 139 and the right front conductor sheet 140 may be installed. The rear face of the left front conductor sheet 139, with the assembly/handling aids in place, may be placed onto the left side of the front 90 of the housing 60. Similarly, the rear face of the right front conductor sheet 140, with the assembly/handling aids in place, may be placed onto the right side of the front 90 of the housing 60. Pins may be placed through alignment holes 306 (FIG. 5B) and alignment holes 307 (FIG. 3C) to align the conductor sheets 139 and 140. Each of the pads 171 of the left front conductor sheet 139 may be positioned over and then welded to the front end (positive terminal) of one of the cells 99 in the two left side columns A and B of the receptacles 62, the connection branches 173 from those pads 171 may be pushed into corresponding channels 102, and the assembly/handling aids may then be trimmed from the left front conductor sheet 139. Each of the pads 172 of the right front conductor sheet 140 may be positioned over and then welded to the front end (positive terminal) of one of the cells 99 in the two right side columns C and D of the receptacles 62, the connection branches 174 from those pads 172 may be pushed into corresponding channels 102, and the assembly/handling aids may then be trimmed from the right front conductor sheet 140. The bus strip 47 may then be folded around the left front corner of the housing 60 and into the recess 68. The bus strip 48 may then be folded around the right front corner of the housing 60 and into the recess 74.

Next, with the front 90 of the housing 60 facing up, mica, ceramic, and/or other refractory materials may be placed over and/or in channels 102 to cover the connection branches 173 of the left front conductor sheet 139 and the connection branches 174 of the right front conductor sheet 140. Mica disks 149 may then be glued or otherwise secured into place on the pads 171 and 172 previously welded to the fronts of the cells 99, and/or onto fronts of the cells 99. The front adhesive layer 142 may then be applied to the front 90 of the housing 60, and the front refractory panel 147 then placed onto the front adhesive layer 142. The front adhesive layer 142 may have openings cut into the layer 142 so as to avoid covering the front openings 162 of the receptacles 62. Any of various types of commercially-available adhesives formulated to withstand high temperatures can be used for the front adhesive layer 142 and for the rear adhesive layer 125. The adhesive layers 142 and 125 may comprise an adhesive applied as a liquid, a double-sided adhesive tape, a ceramic adhesive, and/or other form of adhesive.

Next, the housing 60 may be repositioned so that the rear 63 is facing up. The left rear conductor sheet 121 and the right rear conductor sheet 122 may be installed. The front face of the left rear conductor sheet 121, with the assembly/handling aids in place, may be placed onto the left side of the rear 63 of the housing 60. Similarly, the front face of the right rear conductor sheet 122, with the assembly/handling aids in place, may be placed onto right side of the rear 63 of the housing 60. Pins may be placed through alignment holes 304 (FIG. 4B) and alignment holes 305 (FIG. 3B) to align the conductor sheets 121 and 122. Each of the pads 167, located over the rear end (negative terminal) of one of the cells 99 in the two left side columns A and B of the receptacles 62, may be spot welded to the rear end of the cell 99 over which it is located, and the connection branches 169 from those pads 167 may be pushed into corresponding channels 101. The assembly/handling aids may then be trimmed from the left rear conductor sheet 121. A similar procedure may then be used with the right rear conductor sheet 122. Each of the pads 168 of the right rear conductor sheet 122 may be welded to the rear end (negative terminal) of one of the cells 99 in the two right side columns C and D of the receptacles 62, the connection branches 170 from those pads 168 may be pushed into corresponding channels 101, and the assembly/handling aids may then be trimmed from the right rear conductor sheet 122. The bus strip 37 may then be folded around the left rear corner of the housing 60 and into the recess 67. The bus strip 38 may then be folded around the right rear corner of the housing 60 and into the recess 73. Non-conductive tape (e.g., comprising a polyimide film sold under the trade name KAPTON and a silicone adhesive) may then be applied across the right side bus strips 38 and 48 and the ridge 72 to hold the right side conductor sheets 122 and 140 in place. Non-conductive tape may also be applied across the left side bus strips 37 and 47 and the ridge 69 to hold the left side conductor sheets 121 and 139 in place.

Springs 231 (FIG. 11A) may be placed into recesses in the cavity 64. The thermostat 61 may be placed into the cavity 64 and pushed to compress the springs 231, and the pins 232 inserted to temporarily hold the thermostat 61 against the bias of the springs 231. The leads of the thermostat may be pre-formed to allow those leads to conform to the slot of the cavity 64. A gap pad may also be cut to cover the portion of the cavity 64 containing the thermostat 61 and put into place. Thermal conductivity of the gap filler pad material may be 5 W/m-K or more. The pad size may be trimmed to avoid interference with the opening of the cavity 64, and so that the pad may contact the thermostat 61 when the pins 232 are removed. The rear adhesive layer 125 may then be applied to the rear 90 of the housing 60. The rear adhesive layer 125 may have openings cut into the layer 125 so as to avoid covering the thermostat 61 or the rear openings 164 of the receptacles 62. The gap pads 131 may then be placed onto and over the rear ends of the cells 99 and adhered in place (e.g., using pre-applied pressure-sensitive adhesive on the front face of each pad 131). The heat spreader plate 134 may then be placed onto the rear adhesive layer 125. The gap filler pads 131 may fill the spaces between the heat spreader plate 134 and the ends of the cells 99 so as to facilitate heat transfer. Each of the gap filler pads 131 may contact the heat spreader plate 134 and a rear end of one of the cells 99 (or a pad 167 or 168 welded to that cell 99 rear end). Similarly, the gap filler placed over the thermostat 61 may contact thermostat 61 and the heat spreader plate 134.

An example of a material that may be used for the gap filler pads 131 is the material sold under the trade name BERGQUIST GAP PAD HC 3.0 by Henkel AG & Co. An example of a material that may be used for the gap filler pads covering the thermostat 61 is the material sold under the trade name BERGQUIST GAP PAD HC 5.0 by Henkel AG & Co. Other compressible, electrically non-conductive materials with high thermal conductivity may also or alternatively be used. An example of a material that may be used for the heat spreader plate 134 is an aluminum, copper, or other metallic plate coated with aluminum oxide to provide electrical isolation. Additional examples of materials from which the heat spreader plate 134 may be formed include aluminum nitride and boron nitride.

The film heater 137 may then be applied to the rear face of the heat spreader plate 134. The film heater 137 may include a layer of pressure sensitive adhesive on one face, which adhesive may be pressed into place against the rear face of the heat spreader plate 134. If desired, the film heater 137 may be applied to the rear of the heat spreader plate 134 prior to other assembly operations. The film heater 137 may be applied to the rear of the heat spreader plate 134 so as to avoid air bubbles in the interface between the film heater 137 and the heat spreader plate 134. The rear refractory panel 148 may then be placed over the film heater 137. Pressure may be applied to the heater 137/spreader plate 134/refractory panel 148 stack to press the heat spreader plate 134 completely against the bonding adhesive between it and the housing 60 and so as to provide some compression of the gap pads 131 and help bond the heater 137 and the heat spreader plate 134 to the housing 60. Strips of Kapton tape can be added at top, middle, and bottom edges of the heater 137/spreader plate 134/refractory panel 148 stack taped to the left and right sides of the housing 60 to temporarily hold the assembly in place before final taping and/or shrink-wrap (and/or other overwrap) procedure.

Next, with the housing oriented vertically so that the top 76 is facing upward, the heater wiring harness 25 may be threaded through the hole 54 of the spacer 50 from the underside, and the spacer 50 slid into place between the posts 78 and 77. The rear terminal assembly 31 and the front terminal assembly 41 may each be slid into place in the channel 81. The clamps 33 and 34 of the rear terminal assembly 31 may be removed (alternatively, the clamps 33 and 34 may be removed prior to sliding the terminal housing main body 32 into place in the channel 81). The top portions 191 and 192 of the rear bus strips 37 and 38 (FIG. 4A) may then be bent over the top 76 of the housing 60 so that the holes 193 and 194 in the top portions 191 and 192 are positioned over holes in the main body 32 that receive the screws 35. The clamps 33 and 34 may then be put in place and the screws 35 inserted (through the clamps 33 and 34 and the holes 193 and 194) and tightened.

In a similar manner, the clamps 43 and 44 of the front terminal assembly 41 may be removed (alternatively, the clamps 43 and 44 may be removed prior to sliding the terminal housing main body 42 into place in the channel 81). The top portions 195 and 196 of the front bus strips 47 and 48 (FIG. 5A) may then be bent over the top 76 of the housing 60 so that the holes 197 and 198 in the top portions 195 and 196 are positioned over the holes 187 in the main body 42. The clamps 43 and 44 may be put in place and the screws 45 inserted (through the clamps 43 and 44 and the holes 197 and 198) and tightened.

Non-conducting reinforced tape (e.g., fiber glass reinforced tape) may then be applied over the conductor strips 37, 38, 47, 48, and the non-conducting tape previously applied over the conductor strips, to further reinforce the sides of the battery assembly 10. If desired, non-reinforced non-conducting tape (e.g., KAPTON tape) may be applied as the final layer of the sides 11 and 17 of the battery assembly 10. Additionally, an overwrap or shrink-wrap of non-conducting material may be applied around the outside of the assembly to further reinforce and hold all components in place.

The heater wiring harness 25 may then be routed through the hole 26 in the cross-bar 20 from the underside. The cross-bar 20 may then be put into place so that the terminals 23 and 24 extend through the holes 21 and 22. Fasteners may then be inserted through the holes 201 and 202 in the cross-bar 20 and into the inserts 51 and 52 in the spacer 50, and then tightened to secure the cross-bar in place.

When a lithium-ion cell fails because of thermal runaway, ejecta comprising the cell contents may be expelled from the cell. This ejecta may be expelled at high temperature and may include carbon, aluminum, copper, and/or other materials which may be conductive and/or corrosive. If this ejecta contacts a bus or other electrical connection, damage may occur. For example, the ejecta may cause bridging or shorting that propagates the failure to additional cells. The bus strips 37, 38, 47, and 48 of the conductor sheets 121, 122, 139, and 140, respectively are removed from the front 13 and the rear 15 of the assembly 10, and thereby displaced from ends of the cells 99. In the event of a failure of a cell 99, ejecta from that failing cell is less likely to contact any of the bus strips 37, 38, 47, and 48. The wider sections of bus strips 37, 38, 47, and 48 also add strength to the housing 60.

When cells are bussed in electrical parallel configurations, the failure of any single cell can cause current from the other parallel cells to be discharged into the carcass of the failed cell. This current flow results in heating of the carcass of the failed cell, which heat after some time can cause surrounding cells to go into thermal runaway, initiating a chain reaction that can ultimately propagate throughout all cells in a battery. One method to reduce this risk of propagation is to place electrical fuses on each of the parallel cells to halt the current flow in the carcass of a failed cell, and therefore eliminate the additional heat that can lead to propagation.

Although fused bus-plates are known, ejecta from a failing cell can contact the fuse portions of conventional fused busses. This can result in bridging that allows current to continue flowing after a fuse has opened. To help prevent ejecta from reaching connection branches 169, 170, 173, and 174, those branches are recessed into channels 101 and 102 and protected by insulating material able to withstand high temperature.

Thermal management in batteries may be relevant during both normal operating modes and abnormal failure modes. During normal operations, COTS lithium-ion cells are often not capable of low temperature charging. At least some manufacturers specify that lithium-ion battery cells should not be charged below 0° C., for example. Many applications require operation at lower temperatures, however. For example, military operations may require operation at temperatures from −32° C. to −45° C. In such instances, it may be necessary to heat battery cells prior to charge. During normal operations at high power, heat might also need to be removed from a cell, and transferred to a cooling plate or other heat sink.

During abnormal operations, in the event of an energetic failure of a lithium-ion cell, much heat may be released. Thermal runaway and energetic failures of lithium-ion cells have created fires. If an individual cell in an array of lithium-ion cells goes into thermal runaway, the heat released from that individual cell should be dispersed to avoid overheating neighboring cells and causing them to go into thermal runaway, a process often referred to as failure propagation. If the failure of a cell can be prevented from propagating to other cells in an array, damage can be minimized. Thermal management may help to prevent this propagation.

The heater 137, the thermostat 61, and the heat spreader plate 134 help provide thermal management in the battery assembly 10. At low temperatures, for example, the heater 137 can raise the temperature of the cells 99 to permit charging or other operation. The thermostat 61 controls the actuation of the heater 137 by interrupting current to the heater 137 if the temperature of the heat spreader plate exceeds a set-point of the thermostat 61. The heat spreader plate 134 and the gap filler pads 131 help to increase heat transfer to the cells 99 from the heater 137. During abnormal operation, e.g., if high temperatures are generated because of a cell failure, the heat spreader plate 134 and the gap filler pads 131 help to increase heat transfer and dispersal from the failed cell carcass and to other cells 99, but in a way that may spread the heat among all the cells 99 without concentrating heat on cells 99 adjacent to a failed cell, and/or to an external heat sink (if available, e.g., in a broader assembly into which the battery assembly 10 has been installed). The heat spreader plate 134 and the gap filler pads 131 also help to increase heat transfer and dispersal from the cells 99 during normal high-power operations.

The front refractory panel 147 helps to protect positive terminals of neighboring cells 99, as well as connecting branches 173 and 174 connected to those neighboring cells 99, from heat damage and ejecta if a cell 99 goes into thermal runaway. The weakened regions 220 can be forced away by ejecta to allow venting of a failing cell, and without uncovering the portions of the refractory panel 147 covering the non-failing cells 99.

The gap pads 131 and the gap filler covering the thermostat 61 help to increase heat transfer to and from the heat spreader plate 134 during both normal and abnormal operations. In addition to the example materials previously identified, the gap pads 131 and the gap filler can be formed from other materials that are compressible and compliant so as to maintain contact between the cells 99 and the heat spreader plate 134, and between the thermostat 61 and the heat spreader plate 134, under conditions of shock or vibration, that have high thermal conductivity (e.g., 3.0 W/m-K or more), and that have low electrical conductivity.

The spacer 50 provides electrical insulation between the conductive terminal assemblies 31 and 41, but also locks the housing 60 to the terminal assemblies 31 and 41. The spacer 50 inserts 51 and 52, the right post 77, and the left post 78 may be used to lock the battery assembly 10 into another structure (e.g., to an assembly comprising multiple battery assemblies 10).

Other examples may include variations of and/or omission of any of the features described above. Battery cells may be of a type other than lithium ion. Materials other than those identified above can be substituted for various components. A battery assembly may have more or fewer battery cells, and/or cells may be arranged in a configuration (e.g., a hexagonal pattern, a star pattern) different from that shown for the battery assembly 10. Other non-limiting configurations of bus strip connections and/or terminal assemblies may be used. For example, instead of the clamp/screw arrangements described above, a bus strip could be welded to a terminal housing. Terminals may be directly anchored to a non-conductive body of a housing using one or more inserts (e.g., similar to insert 103). Terminals may be eliminated altogether, with conductive strips welded directly to bus strips to electrically connect one battery assembly to another and/or to a system being powered. Other configurations of heat sensor(s) could be used. For example, solid-state temperature sensors could monitor the temperature of a heat spreader plate and provide signals indicative of the sensed temperatures to a separate control electronics unit, with those control electronics controlling power to a heater.

As an alternative to mica, a refractory panel could be formed from other materials. One example of such materials is a composite refractory board sold under the product designation RS-200 by ZIRCAR Refractory Composites, Inc. of Florida, New York, US. Such a board may comprise, for example, 65% $Al_2O_3$, 21% $SiO_2$, 8% CaO, 4% $B_2O_3$, 1% MgO, and 1% other metal oxides and have a thickness of, e.g., 0.025 inches to 0.125 inches. A refractory panel formed of such a material, with weakened regions similar to those shown in FIG. 10, could be used on a front of the battery assembly 10 in addition to the refractory panel 147 formed from mica.

For the avoidance of doubt, the present application includes the subject-matter described in the following numbered paragraphs ("para."):

1. An article comprising a plurality of battery cells and a plurality of bus strips, wherein the bus strips are displaced from the ends of the battery cells.
2. The article of para. 1, comprising a housing comprising a housing front, a housing rear, housing sides extending from the housing front to the housing rear, and a plurality of cell receptacles extending from the housing front to the housing rear, wherein each of the battery cells is positioned in one of the cell receptacles, and wherein the bus strips are positioned on at least one of the housing sides and are in electrical contact with the battery cells.
3. The article of para. 2, wherein the housing comprises a syntactic foam block, and wherein the cell receptacles comprise holes in the syntactic foam block extending from the housing front to the housing rear.
4. The article of any of para. 1 through para. 3, wherein each of the battery cells is a lithium ion battery cell.
5. The article of any of para. 1 through para. 4, further comprising a refractory panel.
6. The article of para. 5, wherein the refractory panel comprises a plurality of weakened regions, and wherein each of the weakened regions is positioned over one of the battery cells.
7. The article of para. 6, wherein each of the weakened regions comprises a plurality of perforations, extending through the refractory panel, and surrounding a breakout portion of the refractory panel.
8. The article of any of para. 1 through para. 7, further comprising another refractory panel.
9. The article of any of para. 1 through para. 8, further comprising a film heater.
10. The article of para. 9, further comprising a thermally conductive spreader plate positioned between the film heater and the battery cells.
11. The article of para. 10, further comprising heat conductive pads positioned between the heat spreader plate and the battery cells.
12. The article of any of para. 1 through para. 11, wherein each of the bus strips is in electrical contact with each of at least portion of the battery cells via connection branches, and wherein each of the connection branches is recessed in a channel formed in a housing.
13. The article of para. 12, wherein each of the connection branches comprises a strip of conductive material having at least a portion sized to form a fuse.
14. The article of any of para. 1 through para. 13, further comprising a first terminal assembly interlocked with a housing and a second terminal assembly interlocked with the housing.
15. The article of para. 14, further comprising an insulating spacer block positioned between the first terminal assembly and the second terminal assembly and interlocked with the first terminal assembly, the second terminal assembly, and the housing.
16. An article comprising a plurality of battery cells, a film heater, and a heat spreader plate positioned between the film heater and the battery cells.
17. The article of para. 16, further comprising a housing comprising a housing front, a housing rear, housing sides extending from the housing front to the housing rear, and a plurality of cell receptacles extending from the housing front to the housing rear, and wherein each of the battery cells is positioned in one of the cell receptacles.

18. The article of any of para. 16 or para. 17, further comprising heat conductive pads positioned between the heat spreader plate and the battery cells.
19. The article of any of para. 17 or para. 18, wherein the housing comprises a syntactic foam block, and wherein the cell receptacles comprise holes in the syntactic foam block extending from the housing front to the housing rear.
20. The article of any of para. 16 through para. 19, wherein each of the battery cells is a lithium ion battery cell.
21. The article of any of para. 16 through para. 20, further comprising a refractory panel.
22. The article of para. 21, wherein the refractory panel comprises a plurality of weakened regions, and wherein each of the weakened regions is positioned over one of the battery cells.
23. The article of para. 22, wherein each of the weakened regions comprises a plurality of perforations, extending through the refractory panel, and surrounding a break-out portion of the refractory panel.
24. The article of any of para. 16 through para. 23, further comprising another refractory panel.
25. The article of any of para. 16 through para. 24, further comprising a plurality of bus strips, wherein the bus strips are displaced from the ends of the battery cells.
26. The article of para. 25, wherein the bus strips are positioned on at least one side of a housing and are in electrical contact with the battery cells.
27. The article of para. 25 or para. 26, wherein each of the bus strips is in electrical contact with each of at least portion of the battery cells via connection branches, and wherein each of the extension branches is recessed in a channel formed in a housing.
28. The article of para. 27, wherein each of the connection extensions comprises a strip of conductive material having at least a portion sized to form a fuse.
29. The article of any of para. 16 through para. 28, further comprising a first terminal assembly interlocked with a housing and a second terminal assembly interlocked with the housing.
30. The article of para. 29, further comprising an insulating spacer block positioned between the first terminal assembly and the second terminal assembly and interlocked with the first terminal assembly, the second terminal assembly, and the housing.
31. An article comprising a syntactic foam block comprising a block front, a block rear, block sides extending from the block front to the block rear, and a plurality of cell receptacles extending from the block front to the block rear; and a plurality of battery cells, wherein each of the battery cells is positioned in one of the cell receptacles.
32. The article of para. 31, comprising a plurality of bus strips, wherein the bus strips are displaced from the ends of the battery cells.
33. The article of para. 31, wherein the bus strips are positioned on at least one of the block sides and are in electrical contact with the battery cells.
34. The article of para. 32 or para. 33, wherein the bus strips are positioned on at least one of the block sides and are in electrical contact with the battery cells.
35. The article of any of para. 32 through para. 34, wherein each of the bus strips is in electrical contact with each of at least a portion of the battery cells via connection branches, and wherein each of the connection branches is recessed in a channel formed in the block.
36. The article of para. 35, wherein each of the connection branches comprises a strip of conductive material having at least a portion sized to form a fuse.
37. The article of any of para. 31 through para. 36, wherein each of the battery cells is a lithium ion battery cell.
38. The article of any of para. 31 through para. 37, further comprising a refractory panel.
39. The article of para. 38, wherein the refractory panel comprises a plurality of weakened regions, and wherein each of the weakened regions is positioned over one of the battery cells.
40. The article of para. 39, wherein each of the weakened regions comprises a plurality of perforations, extending through the refractory panel, and surrounding a break-out portion of the refractory panel.
41. The article of any of para. 31 through para. 40, further comprising another refractory panel.
42. The article of any of para. 31 through para. 41, further comprising a film heater.
43. The article of para. 42, further comprising a thermally conductive spreader plate positioned between the film heater and the battery cells.
44. The article of para. 43, further comprising heat conductive pads positioned between the heat spreader plate and the battery cells.
45. The article of any of para. 31 through para. 44, further comprising a first terminal assembly interlocked with the block and a second terminal assembly interlocked with the block.
46. The article of para. 44, further comprising an insulating spacer block positioned between the first terminal assembly and the second terminal assembly and interlocked with the first terminal assembly, the second terminal assembly, and the block.
47. An article comprising a plurality of battery cells and a refractory panel, refractory panel comprises a plurality of weakened regions, and wherein each of the weakened regions is positioned over one of the battery cells.
48. The article of para. 47, further comprising a cell array housing comprising a housing front, a housing rear, housing sides extending from the housing front to the housing rear, and a plurality of cell receptacles extending from the housing front to the housing rear, and wherein each of the battery cells is positioned in one of the cell receptacles.
49. The article of para. 48, further comprising a plurality of bus strips, wherein the bus strips are in electrical contact with one of, and is displaced from the ends of, the battery cells.
50. The article of para. 49, wherein the bus strips are positioned on at least one of the housing sides and are in electrical contact with the battery cells.
51. The article of para. 49 or para. 50, wherein each of the bus strips is in electrical contact with each of at least a portion of the battery cells via connection branches, and wherein each of the connection branches is recessed in a channel formed in a housing.
52. The article of para. 51, wherein each of the connection branches comprises a strip of conductive material having at least a portion sized to form a fuse.

53. The article of any of para. 47 through para. 52, wherein each of the battery cells is a lithium ion battery cell.
54. The article of any of para. 47 through para. 53, further comprising another refractory panel.
55. The article of any of para. 47 through para. 54, wherein each of the weakened regions comprises a plurality of perforations, extending through the refractory panel, and surrounding a break-out portion of the refractory panel.
56. The article of any of para. 47 through para. 55, further comprising a film heater.
57. The article of para. 56, further comprising a thermally conductive spreader plate positioned between the film heater and the battery cells.
58. The article of para. 56, further comprising heat conductive pads positioned between the heat spreader plate and the battery cells.
59. The article of any of para. 47 through para. 58, further comprising a first terminal assembly interlocked with a housing and a second terminal assembly interlocked with the housing.
60. The article of para. 59, further comprising an insulating spacer block positioned between the first terminal assembly and the second terminal assembly and interlocked with the first terminal assembly, the second terminal assembly, and the housing.
61. An article comprising any combination or subcombination of features from one or more of any of para. 1 through para. 60.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. Any and all combinations, subcombinations and permutations of features from herein-described examples are within the scope of the invention.

The invention claimed is:

1. An article of manufacture comprising:
   a housing comprising a housing front, a housing rear, housing sides extending from the housing front to the housing rear, and a plurality of cell receptacles extending from the housing front to the housing rear;
   a plurality of battery cells, wherein each of the battery cells is positioned in one of the cell receptacles;
   a plurality of bus strips, wherein the bus strips are positioned on at least one of the housing sides and are in electrical contact with the battery cells via connections extending from the bus strips to the battery cells; and
   a front refractory panel covering the housing front.
2. The article of manufacture of claim 1, wherein each of the battery cells is a lithium ion battery cell.
3. The article of manufacture of claim 1, wherein the housing comprises a syntactic foam block, and wherein the cell receptacles comprise holes in the syntactic foam block extending from the housing front to the housing rear.
4. The article of manufacture of claim 1, wherein the front refractory panel comprises a plurality of weakened regions, and wherein each of the weakened regions is positioned over one of the cell receptacles.
5. The article of manufacture of claim 4, wherein each of the weakened regions comprises a plurality of perforations, extending through the front refractory panel, and surrounding a break-out portion of the front refractory panel.
6. The article of manufacture of claim 1, further comprising a rear refractory panel covering the housing rear.
7. An article of manufacture comprising:
   a housing comprising a housing front, a housing rear, housing sides extending from the housing front to the housing rear, and a plurality of cell receptacles extending from the housing front to the housing rear;
   a plurality of battery cells, wherein each of the battery cells is positioned in one of the cell receptacles;
   a plurality of bus strips, wherein the bus strips are positioned on at least one of the housing sides and are in electrical contact with the battery cells via connections extending from the bus strips to the battery cells; and
   a film heater positioned over the housing rear.
8. The article of manufacture of claim 7, further comprising a thermally conductive spreader plate positioned between the film heater and the battery cells.
9. An article of manufacture comprising:
   a housing comprising a housing front, a housing rear, housing sides extending from the housing front to the housing rear, and a plurality of cell receptacles extending from the housing front to the housing rear;
   a plurality of battery cells, wherein each of the battery cells is positioned in one of the cell receptacles; and
   a plurality of bus strips, wherein the bus strips are positioned on at least one of the housing sides and are in electrical contact with the battery cells via connections extending from the bus strips to the battery cells,
   wherein each of the bus strips is in electrical contact with each of at least a portion of the battery cells via connection branches, and wherein each of the connection branches is recessed in a channel formed in the housing.
10. The article of manufacture of claim 9, wherein each of the connection branches comprises a strip of conductive material having at least a portion sized to form a fuse.
11. An article of manufacture comprising:
    a housing comprising a housing front, a housing rear, housing sides extending from the housing front to the housing rear, and a plurality of cell receptacles extending from the housing front to the housing rear;
    a plurality of battery cells, wherein each of the battery cells is positioned in one of the cell receptacles;
    a plurality of bus strips, wherein the bus strips are positioned on at least one of the housing sides and are in electrical contact with the battery cells via connections extending from the bus strips to the battery cells;
    a first terminal assembly interlocked with the housing;
    a second terminal assembly interlocked with the housing; and
    an insulating spacer block positioned between the first terminal assembly and the second terminal assembly and interlocked with the first terminal assembly, the second terminal assembly, and the housing.
12. The article of manufacture of claim 1, further comprising:
    a film heater, and
    wherein each of the battery cells is a lithium ion battery cell, and
    wherein the front refractory panel comprises a plurality of weakened regions, each of the weakened regions positioned over one of the cell receptacles.

13. An article of manufacture comprising:
- a housing comprising a housing front, a housing rear, housing sides extending from the housing front to the housing rear, and a plurality of cell receptacles extending from the housing front to the housing rear;
- a plurality of battery cells, wherein each of the battery cells is positioned in a corresponding one of the cell receptacles;
- a film heater positioned over the housing rear; and
- a heat spreader plate positioned between the film heater and the battery cells.

14. The article of manufacture of claim 13, further comprising heat conductive pads positioned between the heat spreader plate and the battery cells.

15. The article of manufacture of claim 13, wherein the housing comprises a syntactic foam block, and wherein the cell receptacles comprise holes in the syntactic foam block extending from the housing front to the housing rear.

16. The article of manufacture of claim 13, further comprising a front refractory panel covering the housing front, wherein the front refractory panel comprises a plurality of weakened regions, and wherein each of the weakened regions is positioned over one of the cell receptacles.

17. The article of manufacture of claim 16, wherein each of the weakened regions comprises a plurality of perforations, extending through the front refractory panel, and surrounding a break-out portion of the front refractory panel.

18. The article of manufacture of claim 13, further comprising
- a refractory front plate covering the housing front; and
- a refractory rear plate covering the housing rear.

19. The article of manufacture of claim 1, further comprising a film heater positioned over the housing rear.

20. The article of manufacture of claim 1, wherein each of the bus strips is in electrical contact with each of at least a portion of the battery cells via connection branches, and wherein each of the connection branches is recessed in a channel formed in the housing.

21. The article of manufacture of claim 20, wherein the housing comprises a syntactic foam block.

22. The article of manufacture of claim 7, wherein each of the bus strips is in electrical contact with each of at least a portion of the battery cells via connection branches, and wherein each of the connection branches is recessed in a channel formed in the housing.

23. The article of manufacture of claim 22, wherein the housing comprises a syntactic foam block.

24. The article of manufacture of claim 9, further comprising a film heater positioned over the housing rear.

25. The article of manufacture of claim 9, wherein the housing comprises a syntactic foam block.

26. The article of manufacture of claim 11, further comprising a film heater positioned over the housing rear.

27. The article of manufacture of claim 11, wherein each of the bus strips is in electrical contact with each of at least a portion of the battery cells via connection branches, and wherein each of the connection branches is recessed in a channel formed in the housing.

28. The article of manufacture of claim 27, wherein the housing comprises a syntactic foam block.

* * * * *